US011790936B1

(12) United States Patent
O'Hara et al.

(10) Patent No.: US 11,790,936 B1
(45) Date of Patent: Oct. 17, 2023

(54) COMPUTERISED SYSTEMS AND METHODS FOR DETECTION

(71) Applicant: RPS Group, Inc., Abingdon (GB)

(72) Inventors: David John O'Hara, Oxfordshire (GB); Patrick Rath, Oxfordshire (GB)

(73) Assignee: RPS Group, Inc., Oxfordshire (GB)

( * ) Notice: Subject to any disclaimer, the term of this patent is extended or adjusted under 35 U.S.C. 154(b) by 0 days.

(21) Appl. No.: 17/808,406

(22) Filed: Jun. 23, 2022

(51) Int. Cl.
*G10L 25/78* (2013.01)
*H04R 1/44* (2006.01)
*G10L 25/30* (2013.01)
*G10L 21/14* (2013.01)
*G10L 25/18* (2013.01)
*G10L 21/12* (2013.01)
*G10L 25/51* (2013.01)

(52) U.S. Cl.
CPC .............. *G10L 25/78* (2013.01); *G10L 21/12* (2013.01); *G10L 21/14* (2013.01); *G10L 25/18* (2013.01); *G10L 25/30* (2013.01); *G10L 25/51* (2013.01); *H04R 1/44* (2013.01)

(58) Field of Classification Search
CPC ......... G10L 25/78; G10L 21/12; G10L 21/14; G10L 25/18; G10L 25/30; G10L 25/51; H04R 1/44
See application file for complete search history.

(56) References Cited

U.S. PATENT DOCUMENTS 8,941,728 B2 * 1/2015 Zitterbart ............... G06V 40/10
348/81
9,470,775 B1 * 10/2016 Baggenstoss ............ G01S 5/20
9,651,649 B1 * 5/2017 Salloum ............... G01S 3/8083
2021/0074267 A1 * 3/2021 Higurashi ............ G06N 3/0454

FOREIGN PATENT DOCUMENTS

GB 2522302 A * 7/2015 ............. G01S 15/96

OTHER PUBLICATIONS

Bermant, P.C., Bronstein, M.M., Wood, R.J. et al. Deep Machine Learning Techniques for the Detection and Classification of Sperm Whale Bioacoustics. Sci Rep 9, 12588 (2019). https://doi.org/10.1038/s41598-019-48909-4 (Year: 2019).*
Shiu, Y., Palmer, K.J., Roch, M.A. et al. Deep neural networks for automated detection of marine mammal species. Sci Rep 10, 607 (2020). https://doi.org/10.1038/s41598-020-57549-y (Year: 2020).*
"Scipy.signal.windows.hann", retrieved from, https://docs.scipy.ora/doc/scipy/reference/generated/scipy.signal.windows.hann.html on Feb. 28, 2023 (2 pages).
"Audacity", retrieved from https://www.audacityteam.org/ on Feb. 28, 2023 (5 pages).

* cited by examiner

Primary Examiner — Ian J Lobo
(74) Attorney, Agent, or Firm — DLA PIPER LLP (US)

(57) ABSTRACT

Methods and systems for detecting marine mammals. Acoustic data can be received from one or more hydrophones. The acoustic data can be sampled, and the sampled acoustic data can be transformed to time-frequency image data. The image data can be processed to transform the data for input to a model. The model can be trained to detect the presence or absence of marine mammal vocalizations in the acoustic data. The model can output a prediction of whether or not a mammal is present.

54 Claims, 28 Drawing Sheets
(6 of 28 Drawing Sheet(s) Filed in Color)

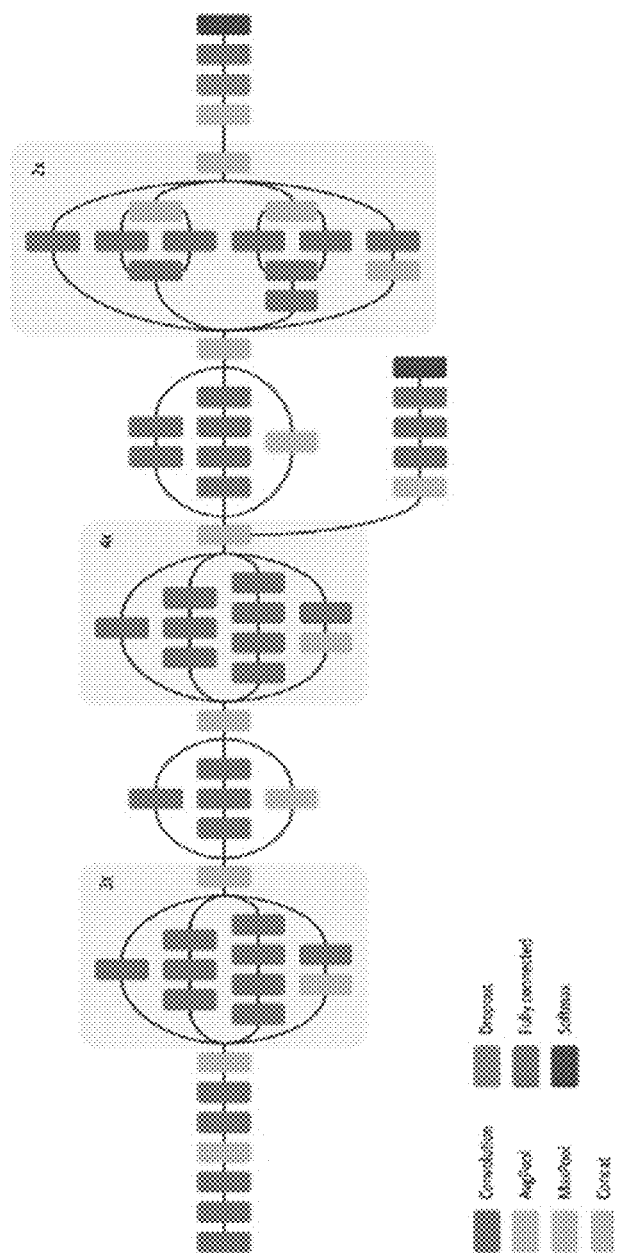

| NEW | Project: | No active project |
|---|---|---|
| OPEN | Date Created: | dd/mm/yyyy |
| | Vessel name: | Enter vessel name |
| CLOSE | Creator: | Enter creator name |

FIG. 13

AUDIO SOURCE   AUDIO SETTINGS

⬤ Audio file (wav)   ◯ Live Audio (port)   ◯ Server (http

Audio file path (.wav)                              ...

Sample rate (Hz)   No file loaded
Duration (s)       No file loaded
No. channels       No file loaded

| START | STOP |

FIG. 14

AUDIO SOURCE   AUDIO SETTINGS

Sample rate (Hz)                    48000

Chunk size (frames/buffer element)  24000

Live time (s)                       20

START                               STOP

FIG. 16

AUDIO SOURCE   AUDIO SETTINGS

○ Audio file (wav)    ○ Live Audio (port)    ● Server (http

Server address  _____

Username        _____         LOGIN

Password        _____

START                               STOP

FIG. 17

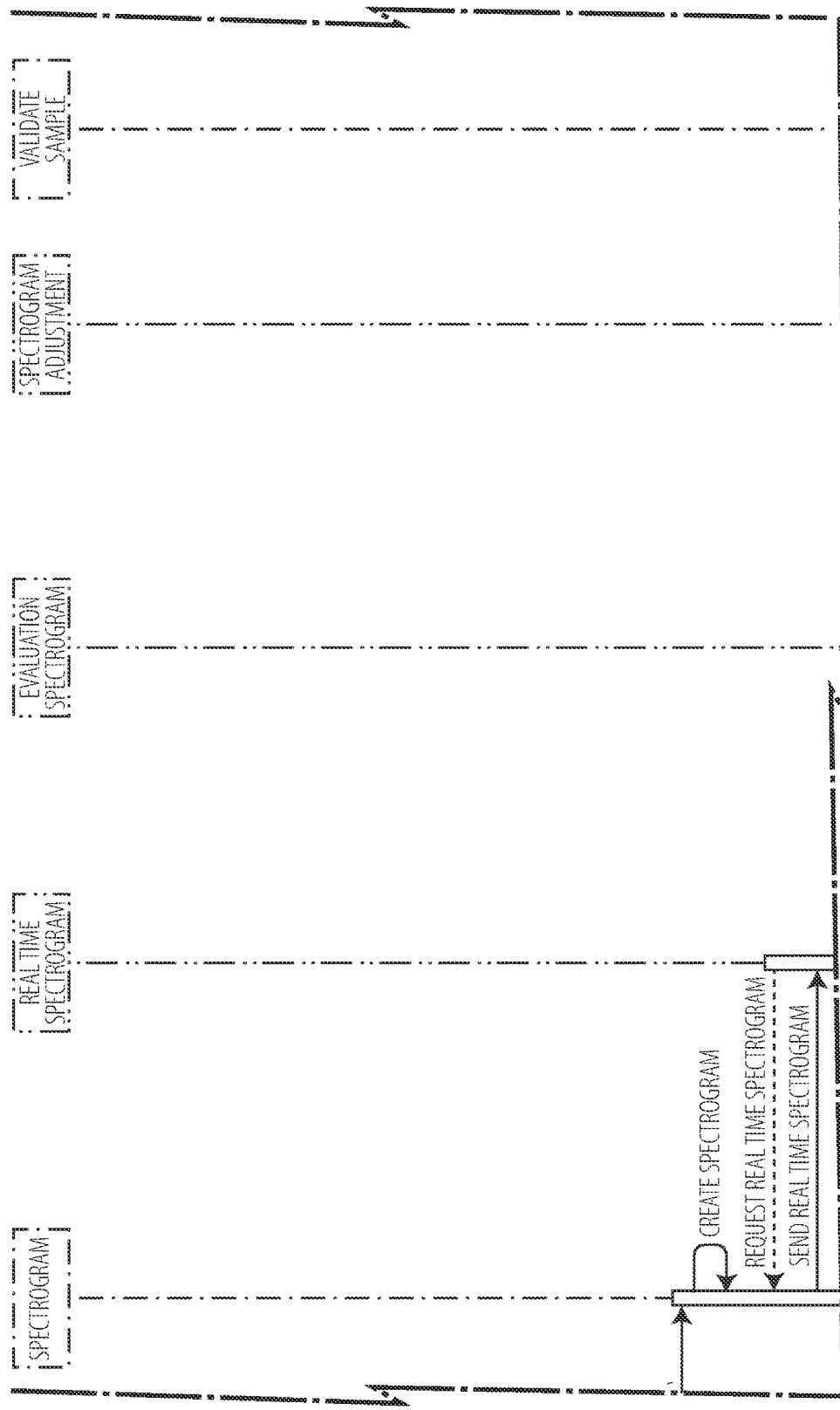

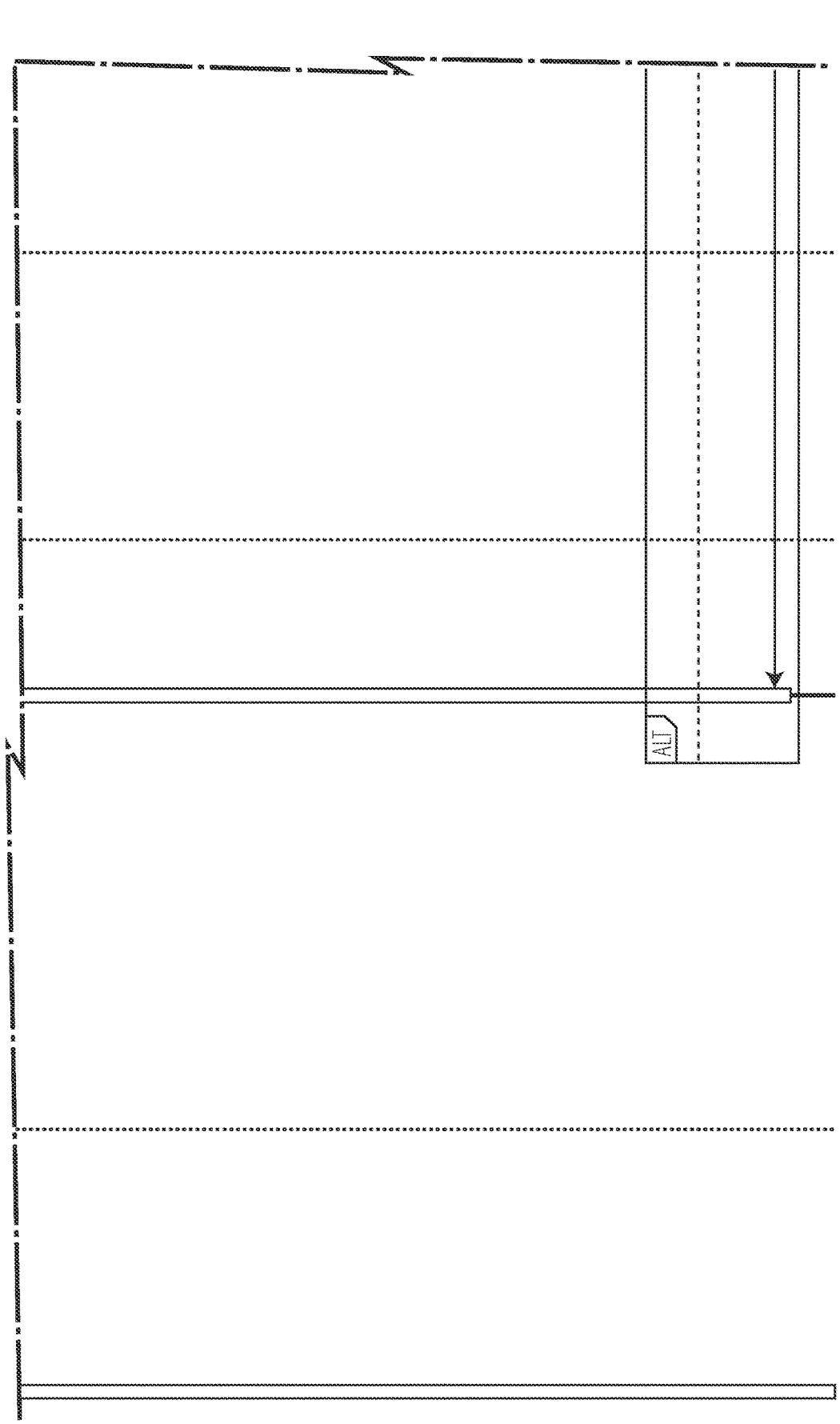

COMPUTERISED SYSTEMS AND METHODS FOR DETECTION

Many marine activities can involve underwater sound emissions. These may be produced as a by-product of the activity (e.g. piling or explosives), or intentionally for sensing (e.g. air guns used for seismic surveys in oil and gas exploration, or military/commercial sonar). Marine mammals can be sensitive to sound underwater and this leads to concerns that they might be physically affected or their hearing might be affected if they are exposed to high levels of sound. One strategy for mitigating against these risks is to monitor for animals within a zone of influence and either delay or shut down noise producing operations if sensitive animals are detected within this zone.

One method for detecting marine mammals at sea can be visual observations. However, marine mammals can be difficult to spot on the sea surface, especially when weather and light conditions are poor, and these techniques may only be viable during daylight hours.

Many marine mammals can produce loud and distinctive vocalizations, which can be used for detection in so-called Passive Acoustic Monitoring techniques. Compared with visual techniques, acoustic methods may have the advantages of: greater range, that the animal does not need to be at the surface, that the method may be less affected by weather and sighting conditions, or that animals can be detected acoustically equally well day and night, or any combination thereof.

Currently, some PAM methods may rely on human operators monitoring the audio feed and/or using computerized tools to help them analyze the audio feed. However, marine mammal may vocalize over a wide range of frequencies and can extend beyond human hearing ranges. For instance, blue whales may produce infrasonic vocalizations below the lower bound of human sensitivity while harbor porpoise may produce narrow band pulses in the high ultrasonic above the higher bound of human hearing. Relying on human operators may also introduce an element of subjectivity leading to a lack of consistency and accuracy, as well as possibly being expensive in terms of the human resources required.

The current disclosure relates to a computerized system and method for marine mammal detection and to a user interface and to a method of training a model for marine mammal detection.

Embodiments disclosed herein can detect marine mammal vocalizations via underwater acoustic signals. The system can include components including:
- Machine learning models for marine mammal acoustic detection
- Front-end interface to serve and record/store detections The system can include appropriate hardware for underwater acoustic signal acquisition, e.g. detected by hydrophones on board a vessel or positioned on the seabed or fixed at any other desired position, and computer hardware to execute the machine learning software and host the user interface.

The current disclosure discusses methods that may improve detection and or classification of the marine mammals and may: reduce or eliminate the subjectivity of purely human based approaches, reduce false positives, reducing the human resources required, reduce delay in real time monitoring, or potentially leverage additional data cues that are not available to human operators, or any combination thereof. Other benefits are also possible.

BRIEF DESCRIPTION OF DRAWINGS

The file of this patent contains at least one drawing executed in color. Copies of this patent with color drawings will be provided by the Patent and Trademark Office upon request and payment of the necessary fee.

Embodiments of the disclosure will now be described by way of example with reference to the accompanying drawings, in which:

FIG. 9 shows an example of a convolutional neural network model suitable for detecting marine mammal vocalizations in an embodiment;

FIGS. 11 to 18 show examples of screens and pop-up windows as part of a user interface.

DETAILED DESCRIPTION OF ASPECTS OF THE DISCLOSURE

Embodiments of the disclosure provide a marine mammal detection system that can use advanced technologies including machine learning in particular to detect the presence of a marine mammal through acoustic events. The resulting system may be used in operations to support PAM operators and improve rate and accuracy of detection, thus improving mitigation and ensuring offshore activities do not impact the marine mammal population.

Objects of embodiments of the disclosure can include:—
Develop a system than can accurately and reliably detect the presence of a marine mammal through vocalization.

The system may be highly capable and statistically robust in differentiating between marine mammal vocals/calls, non-biological sources of noise and ambient noise.

Model(s) may learn high-level presentations that can generalize to additional species.

Handling of recordings with multiple vocalizing mammals (e.g. Dolphin pods, mixed whales and dolphins etc.) may be done.

It will be appreciated that any features expressed herein as being provided "in one example" or "in an embodiment" or as being "preferable" may be provided in combination with any one or more other such features together with any one or more of the aspects of the present invention.

System

Figure 1:
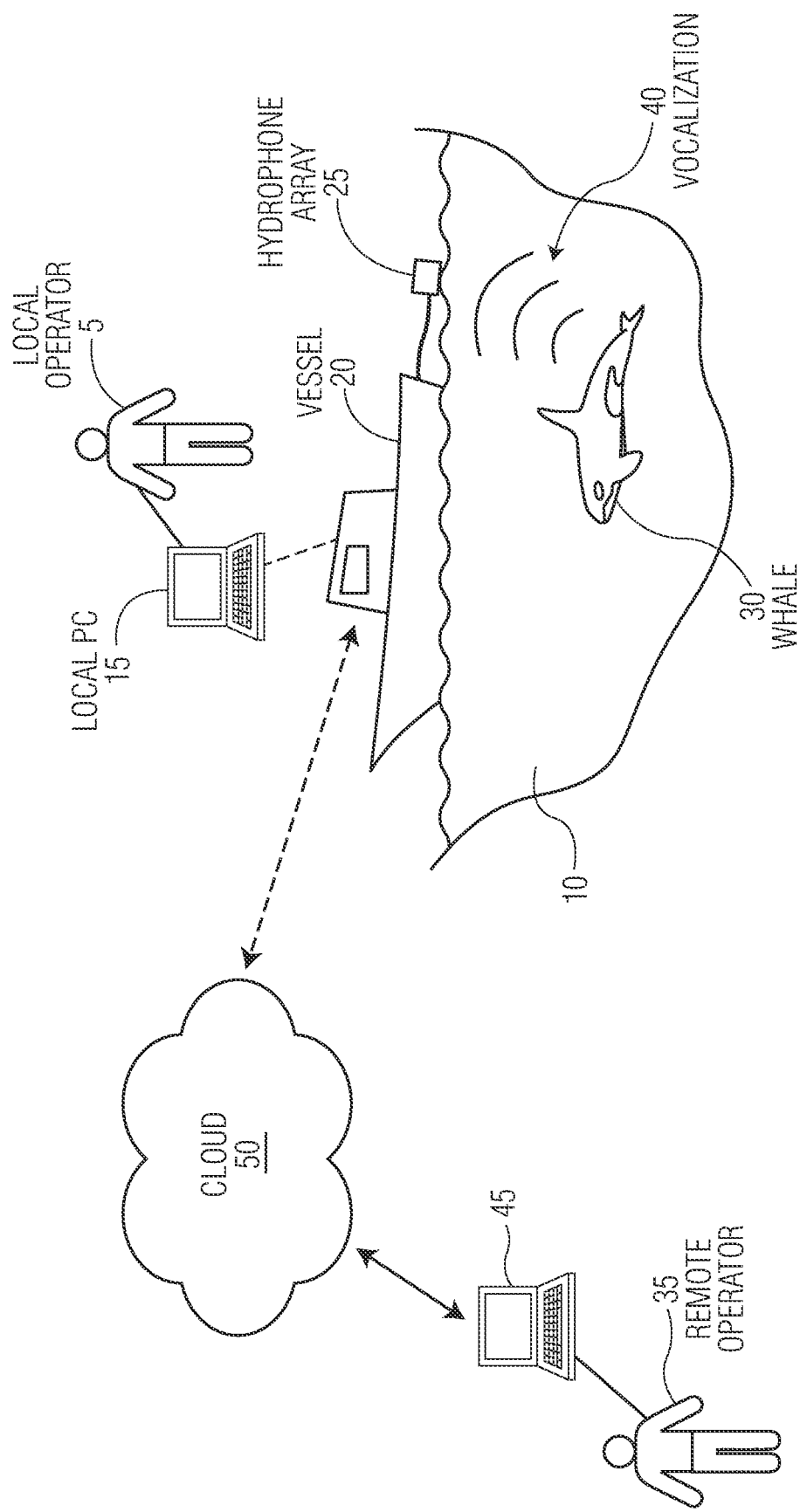
FIG. 1 shows an example marine environment and an example of a system for monitoring and detecting marine mammals in that environment according to an embodiment.

FIG. 1 shows an example of a system for detection of marine mammals.

A computing device 15 may be set up on board a vessel 20 operating in a marine environment 10 in which marine mammals 30 are to be detected. The vessel may tow a hydrophone array 25 which may detect acoustics 40 in the marine environment 10 and may send sound packets of continuous data to the computing device 15.

Figure 2:
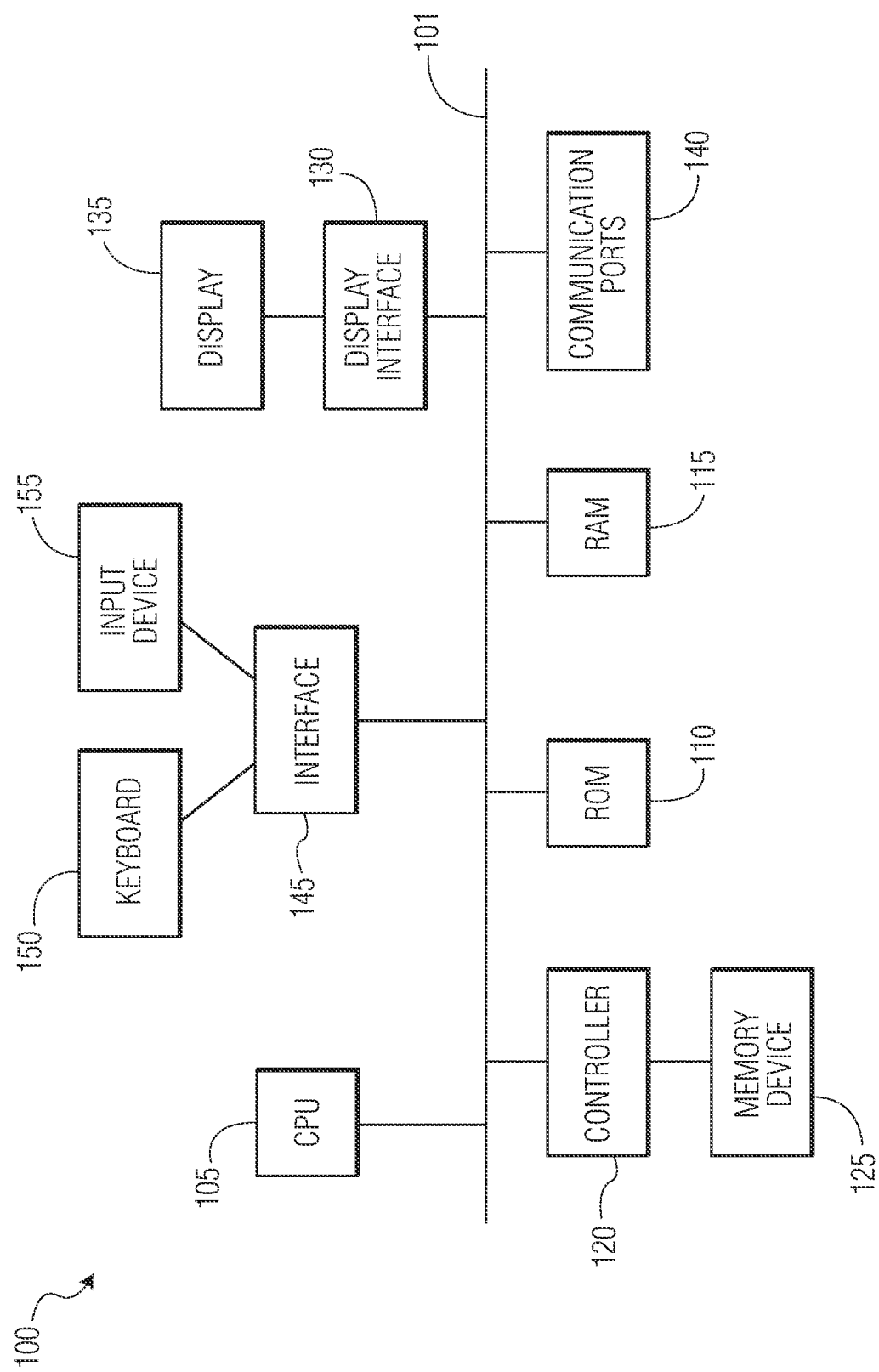
FIG. 2 shows example elements of a computerized system for carrying out some or all of an example method.

FIG. 2 shows in more detail a computing device 100 (e.g., computing device 15 or remote computer 45) of FIG. 1. Memory (e.g., RAM, ROM) may store a computer program which when executed by the processing device may implement the marine mammal detection model as well as working memory. The computing device may also store a database of acoustic samples. The computing device 15 may also comprise a communication interface, for example for communicating with a cloud server, a soundcard or other sensor I/O interface, for receiving data from the hydrophone array 25, a User Input interface, e.g. for receiving input from a user via a keyboard and mouse, and a display output interface for displaying output to the user.

FIG. 2 depicts a block diagram of an example data processing system (e.g., computing device 100) comprising internal hardware that may be used to contain or implement the various computer processes and systems as discussed above. In some embodiments, the example internal hardware may include or may be formed as part of a database control system. In some embodiments, the internal hardware may include or may be formed as part of an additive manufacturing control system, such as a three-dimensional printing system. A bus 101 may serve as the main information highway interconnecting the other illustrated components of the hardware. CPU 105 may be the central processing unit of the system, performing calculations and logic operations required to execute a program. CPU 105 is an example processing device, computing device or processor as such terms are used within this disclosure. Read only memory (ROM) 110 and random access memory (RAM) 115 constitute example memory devices.

A controller 120 may interface with one or more optional memory devices 125 via the system bus 601. These memory devices 125 may include, for example, an external or internal DVD drive, a CD ROM drive, a hard drive, flash memory, a USB drive or the like. As indicated previously, these various drives and controllers, as any part of FIG. 2, are optional devices. Additionally, the memory devices 125 may be configured to include individual files for storing any software modules or instructions, data, common files, or one or more databases for storing data.

Program instructions, software or interactive modules for performing any of the functional steps described above may be stored in the ROM 110 and/or the RAM 115. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 130 can permit information from the bus 101 to be displayed on the display 135 in audio, visual, graphic or alphanumeric format. Communication with external devices can occur using various communication ports 140. An example communication port 140 can be attached to a communications network, such as the Internet or a local area network.

The hardware can also include an interface 145 which allows for receipt of data from input devices such as a keyboard 150 or other input device 155 such as a mouse, a joystick, a touch screen, a remote control, a pointing device, a video input device and/or an audio input device.

The computer program may comprise a frontend where the user can opt to create a project. This project may be accompanied by a database stored in the memory where subsequently received marine mammal acoustic detections may be stored automatically. A front-end component may allow the user to validate the samples and add additional, valuable metadata.

It will be appreciated however that in other embodiments the model may be executed by computing devices not local to the vessel 20, such as in the cloud 50 or a remote computer 45, e.g. using a satellite communication link to transmit data to and from the vessel. Similarly, other sensors than a hydrophone or hydrophone array may be used to detect vocalizations.

Figure 3:
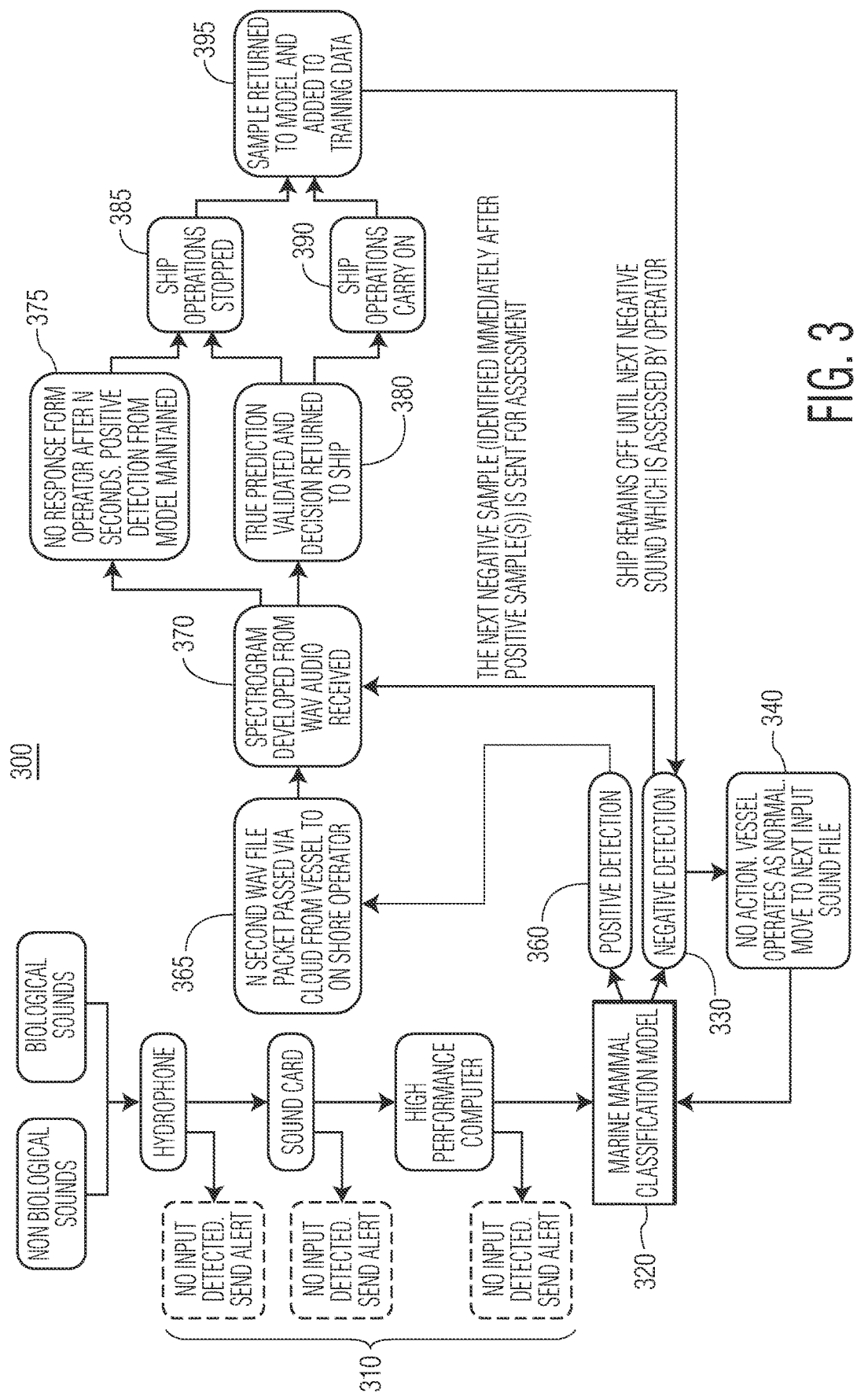
FIG. 3 shows an example overall process for performing marine mammal detection according to an embodiment.

FIG. 3 shows a possible sequence of operation 300 in more detail. In this sequence, the software may run automatically on board the vessel 20 determining whether or not a marine mammal 30 is detected in the acoustic input data and flagging a decision of whether or not to suspect operations of the vessel, together with on-shore validation of the decision by a remote operator. The model 320 may receive sounds from the hydrophone array in steps 310 (as described above). The program may generate alerts to the operator 5 if there is no input detected by the hydrophone, the sound cards or the computing device. The marine mammal classification models may infer the presence of a marine mammal vocalization. If there is no sound 330, the model may not use alarm 340.

If there is a sound 360, this sound file may be transferred 365 over a suitable communication network, e.g. cloud network 50, to a remote computer 45 or cloud computer, where the on-shore PAM operator can assess the issue and make a decision.

This may be done in real time or near real time. Individual operators may receive feeds from individual vessels. Alternatively, the operator may receive feeds from plural vessels and so a single operator may validate decisions made in respect of plural vessels, leading to a significant reduction in operator-hours needed to run the system.

In the case of the model making a positive detection, this may be communicated to a remote computing device 45 or a cloud server via a communication link and validated by a remote operator 35. For instance, a two second packet of audio may be received on shore by the operator. Their on-shore system 45 may create the spectrogram from the 2 sec audio packet they have received. The PAM operator may make their own decision based on both the sound and visual data presented to them of whether there a marine mammal present, e.g. validate the decision made by the model.

Their decision may be returned 380 to computing device on the vessel via the communication network. The operation of the ship may be suspended or not, e.g. ship signal/noise turned off 385 or kept on 390 depending on the decision. This might be automatic or the decision displayed to the local operator 5 who implements the necessary actions. The PAM operator decision may be given greater weight than the model decision and allowed to override it.

The remote operator 35 may also labels the audio sample, e.g. with presence or not of marine mammal and optionally type of marine mammal. Having been labelled, these assessed samples may be returned to the project database 395 to become additional data for updating the model(s) via the continuous improvement life-cycle. High-quality labeled data may be helpful to machine learning, and so iteratively improving the data may allow the model performance to quickly improve (without necessarily changing the model hyperparameters), e.g. using a data-centric approach to continually improving the model.

In the case of the model making a negative detection (False positive), the PAM operator may return their response of no marine mammal detected. The false positive sample may be maintained in the database records. The ship's operation may continue to run as normal. Optionally, the operator may assess the next n number of audio samples, to help ensure they have made an accurate decision.

In the case of the model missing a detection (False negative), then the operator may: have the facility via front-end tools to capture the audio snippet, create a sample in the database and complete the necessary metadata. Again, this may be logged appropriately in the database as a false negative (missed sample) to help ensure subsequent model calibrations are focused on improving detection.

Optionally, a persistence may be set on each positive detection before the next packet can be assessed based on assessing the average length of call. For example, if the average Dolphin sound is 3 seconds, keep the ship off and send no further assessment samples until N seconds after the last call.

If there is no response from an operator, the model decision may be acted on as the Marine Mammal model has high levels of accuracy. After N seconds of no response, the model may flag the action to the ship.

Other validation checks may be implemented. For instance, the software may track: when was the last validation sample sent and received; what is the average length of time currently, between pods of Dolphins or Whales; or has there been any validation samples sent to/between the ship and PAM operator in this length of time, and if not, investigate possible reasons (for instance, is there an issue with signals and/or equipment?; or any combination thereof. Other validation checks may also be used.

If there is no signal/audio from the hydrophones in N amount of seconds, this may be immediately flagged by the operator as they could be missing marine mammal sounds.

Data Understanding and Gathering for Modelling

Figure 4:
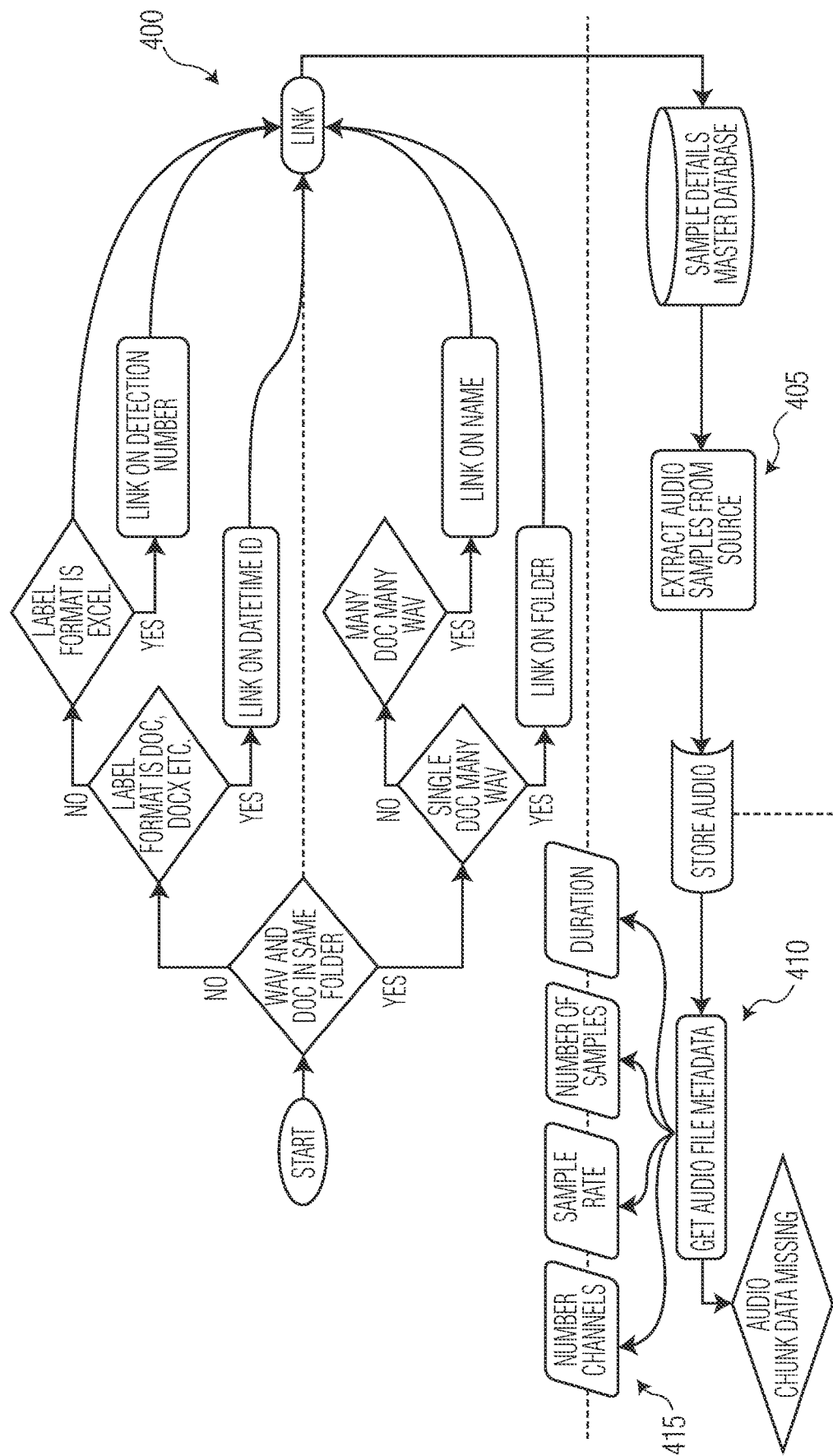
FIG. 4 shows an example process for processing and standardizing source data files for training detection models.

An issue with using artificial intelligence to detect marine mammal vocalizations may be the disparate sources and structures of data of previous detections from which the AI is expected to learn. Initial steps may be: understanding and preprocessing the data to standardize its form; and putting it in a suitable format to support data science and machine learning experiments, as shown by FIG. 4.

In particular, the audio data made available for the development of the models may originate from historical seismic surveys, potentially together with metadata files generated by human operators which attempt to classify the vocalization and give additional detail.

Shared files may include:

Thousands of wave files (both with and without positive detections) and/or examples of electrical interference and anthropogenic noise.

Documents and/or other unstructured data sources containing detection details and metadata Due to the variation of file storage techniques (between exploration projects, operators, and data storage protocols), a relatively complex task of data exploration and understanding may be conducted. This activity may aim to decipher as much data as necessary from the folder structures, and/or help ensure audio detection samples are matched with the correct metadata file, and support initial data analyses.

The relationship between detection documents and audio file may be one to many (e.g., one document can be considered metadata for many audio files).

Audio files may be variable in length, source vessel, operator, etc. amongst other mainly categorical variables. The vocalization may be present in only a small part of the audio file, or multiple vocalizations being present of the same or different types at different times in the audio file. The input files may also contain QAQC (quality assurance quality control) audio, such as other sounds that can be expected to be picked up in the operating field, such as marine diesel engines, etc. which may also be presented to models for training purposes to help it learn to distinguish between it and marine mammal vocalization.

The "metadata" associated with the audio file can also vary in that some operators may classify as whale or dolphin, and others may attempt to identify individual species of mammal. Some may use different nomenclature, e.g. dolphin, delphinid, etc. for the same thing, and many files may include human-produced error in terminology and spelling.

To address these technical problems, the data exploration and understanding stages, combined with the volume of data may show a need to automate the extraction of audio data along with respective metadata documents. Custom code constructs may be developed to recursively dive through the directories, select audio files, use file naming conventions and timestamps to link metadata, etc., as shown by FIG. 4 step 400.

Furthermore, the metadata files (typically word processing files of various types such as .doc, .docx, .odf, .rtf) may require dynamic approaches and use of machine learning techniques to review and extract key information into a structured format. The machine learning component may be adopted to help account for inconsistencies in the document data and may rather use similarity distance measuring to match specific values to a pre-defined schema.

Where the similarity distance measure is below an acceptable threshold, then the associated value may not be accepted (since it has likely matched the incorrect schema key). Matches at or above the similarity threshold may be accepted.

The outputs of metadata may then be further reviewed by data scientists to help ensure the values are within a defined range of possible, appropriate values. At times, it may be necessary to review the documents manually and potentially remove the record of metadata and all audio samples due to high uncertainty.

FIG. 4 shows an example process for extracting the information from the source metadata files and creating a one-to-one correspondence with the audio samples.

This data extraction and collection process may lead to the development of a preliminary audio sample and metadata database for review and analysis as shown by steps 405,410 in FIG. 4.

The results may take the form of a database of semi-structured data comprising entries which may include: 1) the sample identifier, 2) whether or not a marine mammal is present, 3) the category of the sound, e.g., group of marine mammal (dolphin/whale) or QAQC, 4) species of marine mammal (if known); 5) details of the state of the sea and hydrophone set up, or 6) audio sample properties; or any combination thereof.

Analysis of the audio detection samples, and respective metadata may reveal high variability in the quality of audio data, length of recordings, number of channels etc., at step 415. Additionally, there may be no indication or detail relating to the exact timestamp of a marine mammal vocalization within any audio detection sample. Some of the audio samples may be very long and may or may not contain any marine mammal vocalization. Consequently, there may be an obvious need to investigate data, and more importantly, metadata quality.

Quality Assessment

Optionally, at this stage, the audio data can be reviewed by a bio-acoustician to provide validation labels. This might provide additional data concerning the order/species, the type of vocalization (e.g. click/whistles/moans, or combinations thereof). Additional data may be included as to a confidence rating of the classification (which can be used to dispense with marginal identifications), and precise start and end times of the vocalization within the sample.

Figure 5:
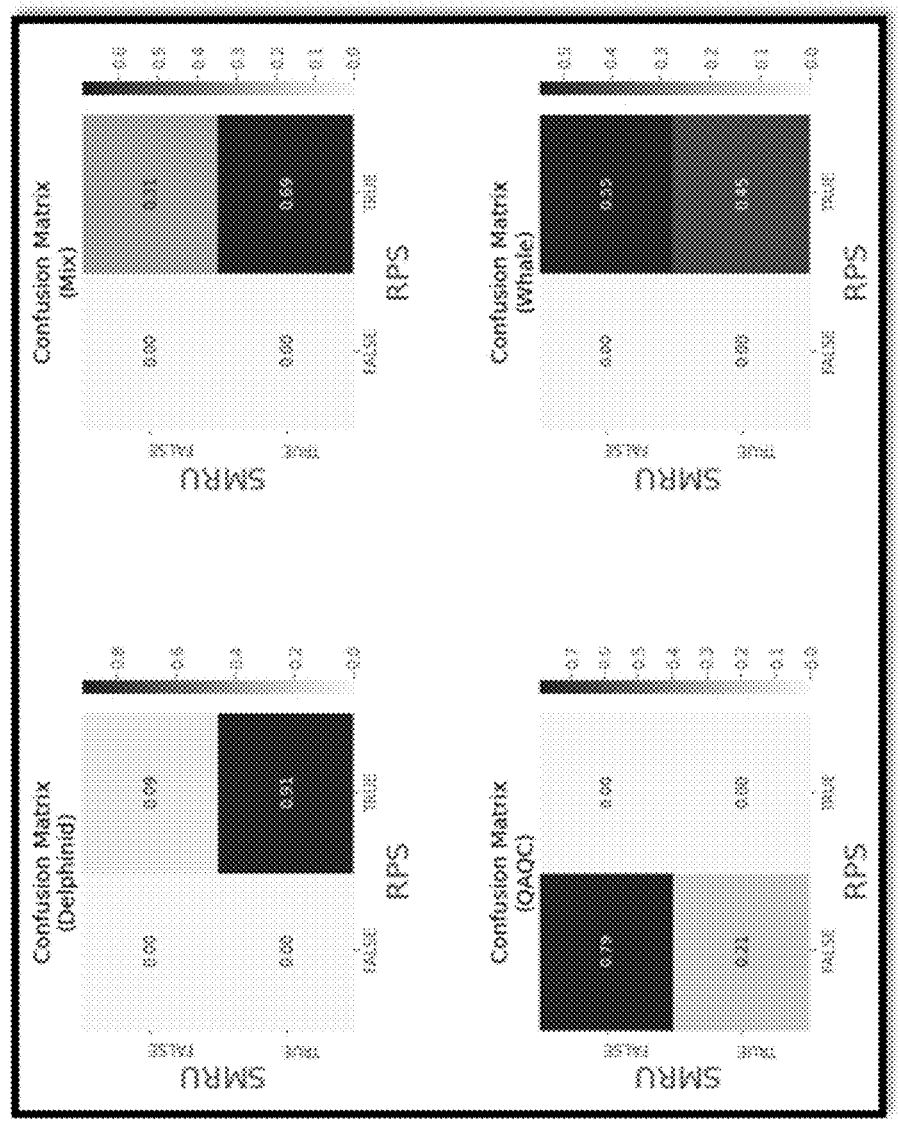
FIG. 5 shows examples of confusion matrices.

The existing metadata and reviewed metadata can be compared at this stage to determine the confidence level in the accuracy of the data. FIG. 5 shows "confusion matrices" for various types of source sound showing a good level of agreement of the metadata, indicating good confidence in the accuracy of the data. It may also reveal audio samples where no vocalizations are present, which can occur due to human error (e.g., incorrect decision, forgetting or accidentally pressing record, operator starting and stopping recording during and between vocalizations).

Data Annotation

This analysis may result in a conclusion that the data needs strong annotations (e.g., rather than an audio file; of arbitrary length, being regarded as a positive sample, the ability to calibrate models relies on samples that are focused on the vocal signal. Hence, any audio sample could contain zero or more vocalizations and thus, the start and end time (as well as frequency and assumed mammal group) may be annotated appropriately).

Higher quality annotations and representative data may provide the best opportunity to calibrate machine learning models. The annotations may form a representation of what class of objects the data belongs to and may help a machine learning model learn to identify that particular class of objects when encountered in unseen data.

In on example case, batches of 1000 audio files may be prepared and shared with a small team of experienced passive acoustic monitoring operatives.

Use of open source software (Audacity https://www.audacityteam.org/) may be used to annotate the audio files from scratch and generate annotation files.

Each annotation record may provides the start, end, min and max frequency as well as D for "Dolphin", "W" for "Whale" and "NO" for non-biological.

Training Data Preparation

Figure 6A:
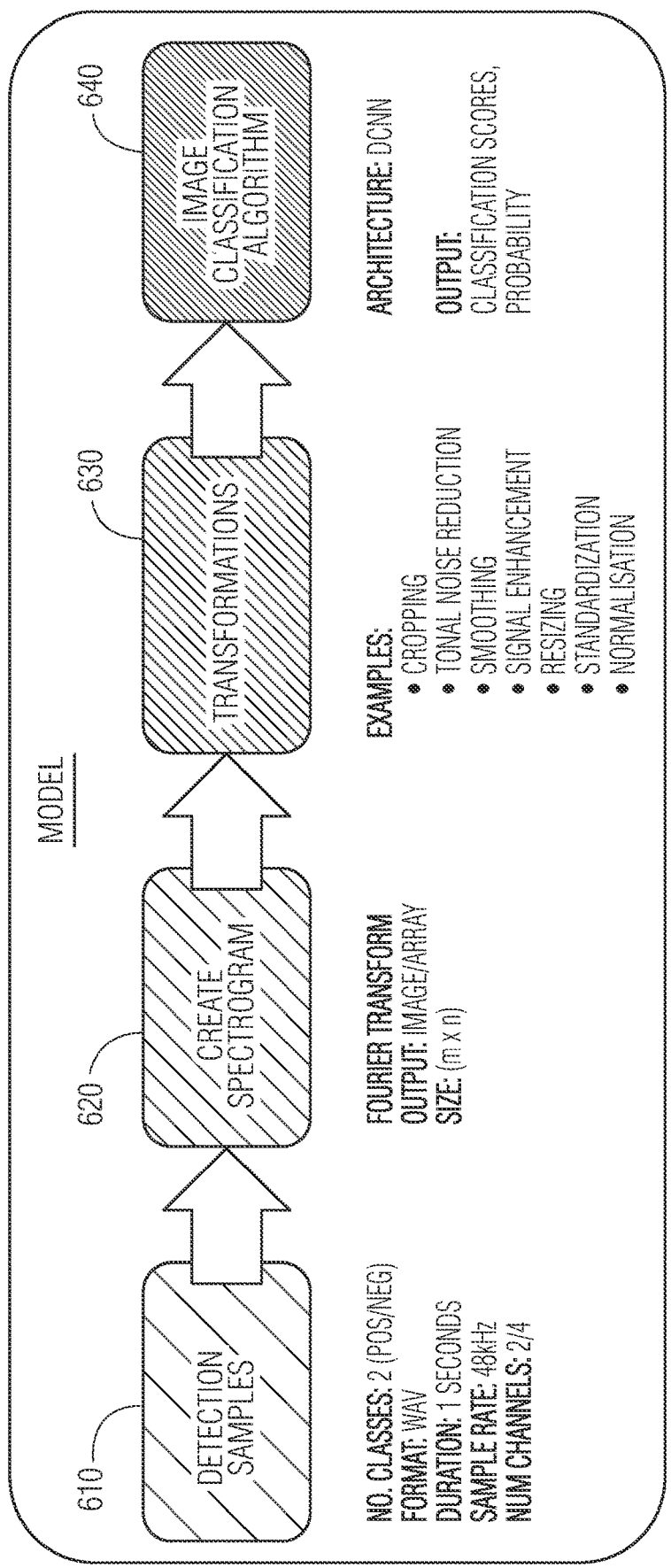
FIG. 6A shows an example general view of a model for detecting marine mammals based on input sound samples and FIG. 6B shows a general view of training the model.

As shown by FIG. 6A, at step 610, detection samples may be prepared from the database of source sounds. As described above, each source file, e.g. 10 minutes of audio, may contain multiple sounds, e.g. 20 or more. The samples for each sound may be extracted with reference to the metadata. For each positive sound sample, a negative sample may be automatically also obtained from the same source audio file to balance the training inputs to the model.

The output of this process may be thousands of small audio .wav files (both positive and negative samples) with unique global identification as the filename, further suffixed with 1 or 0 to indicate a positive or negative sample respectively. A link may be maintained between the sample name and its parent audio file, allowing for traceability and further cohort analysis based on factors such as vessel name, operator name, sea state, etc.

Training pipeline

The pipeline may be designed to closely reflect deployment scenario to minimize inconsistencies between the training code constructs and deployment code constructs. The pipeline may comprise any combination of the following steps:

Read raw audio from source file
Perform pre-processing (multi-channel to mono waveform)
Perform Fourier transform to obtain two-dimensional spectrogram
Perform pre-processing on spectrogram (tonal noise reduction, scaling, cropping)
Inference (classification)

As shown by FIG. 6A, after reading the raw audio files and converting the signal to a mono waveform, at step 620, spectrograms may be created for each sample. This may transform the audio data into two dimensions (here time and frequency) and may allow image classification approaches to be used in detecting marine mammal vocalizations.

Figure 7:
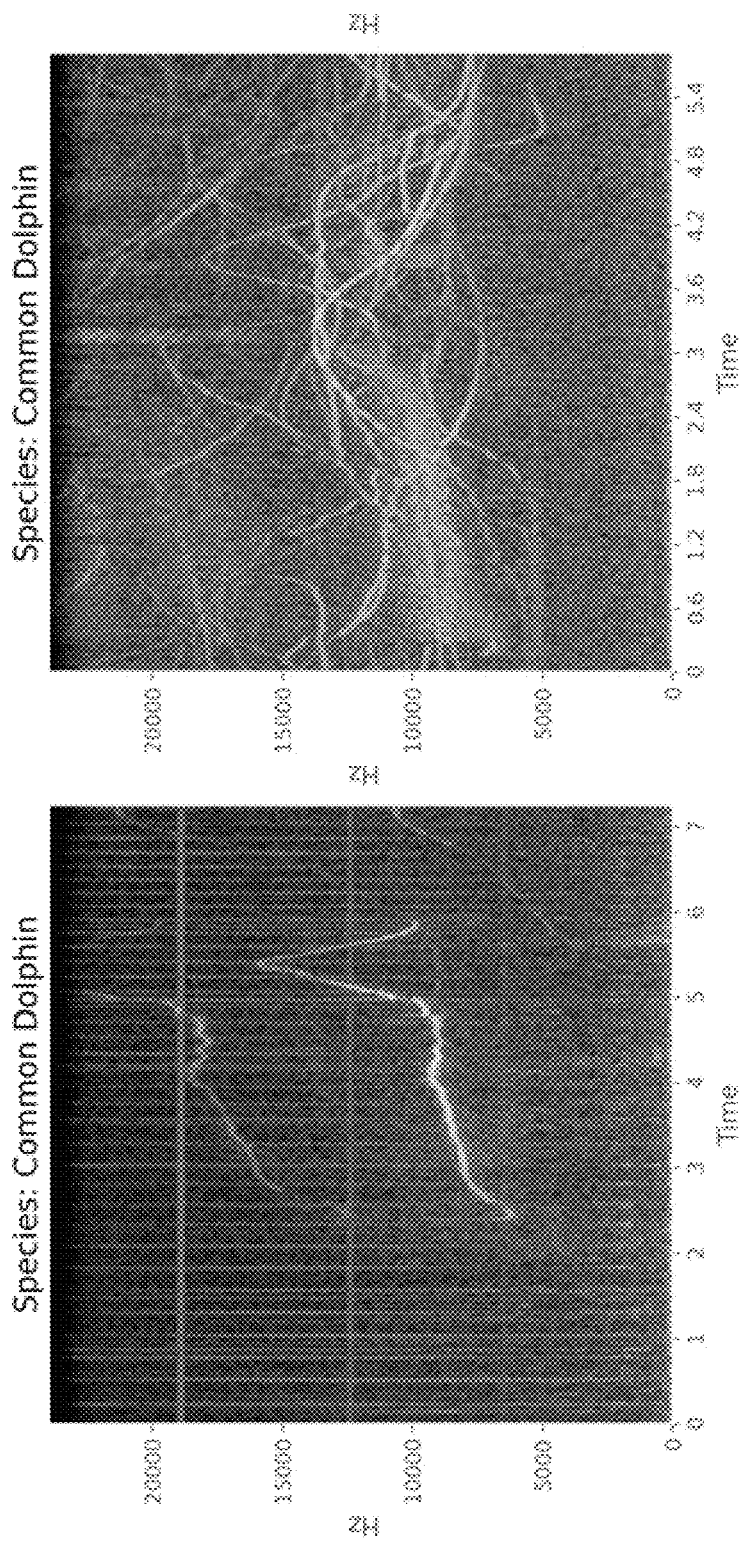
FIGS. 7 and 8 show examples of spectrograms of marine mammal vocalizations.
Figure 8:
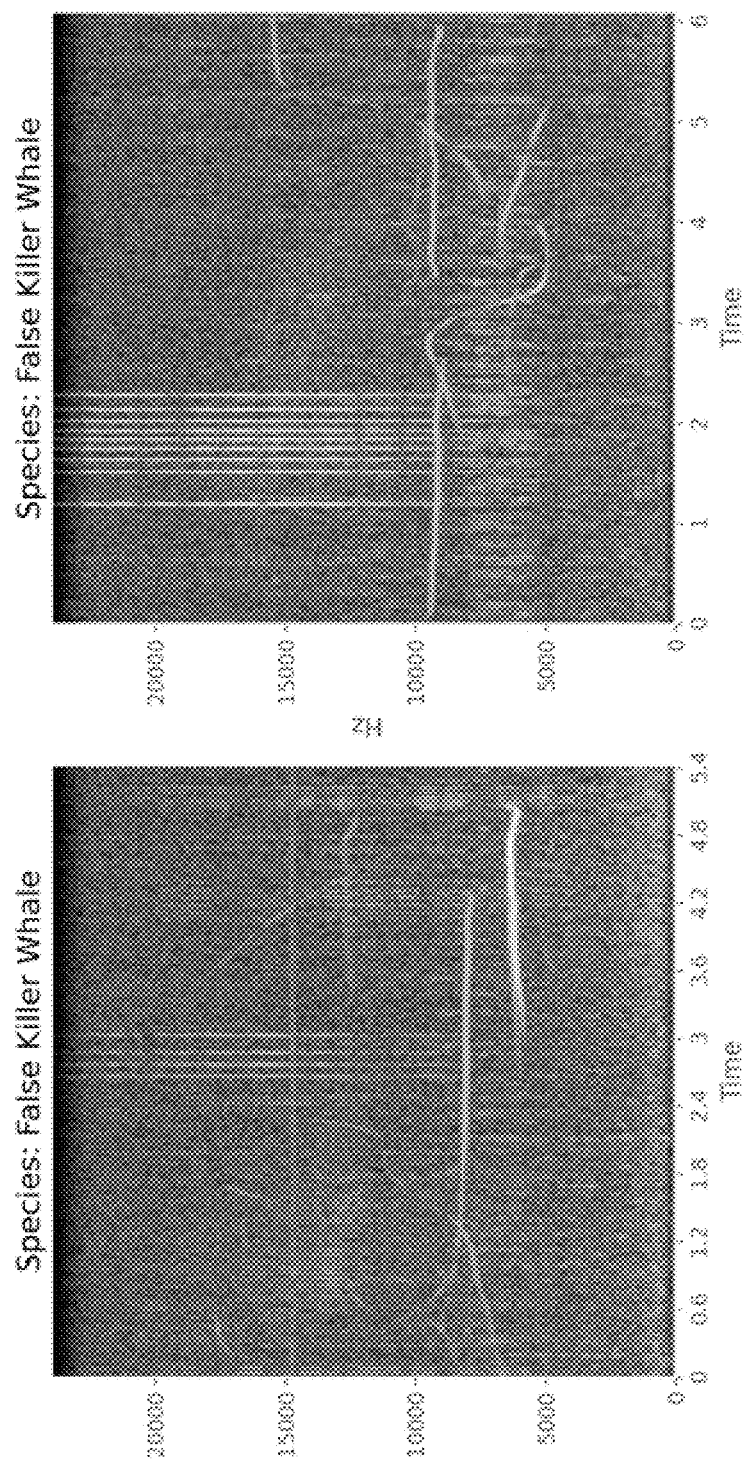

FIGS. 7 and 8 show examples of spectrograms for various marine mammal vocalizations. A spectrogram may be a visual representation of the spectrum of frequencies of a signal as it varies with time. When applied to an audio signal, spectrograms are sometimes called sonographs, voiceprints, or voicegrams. A spectrogram can be generated by an optical spectrometer, a bank of band-pass filters, by Fourier transform or by a wavelet transform (in which case it is also known as a scaleogram or scalogram). The time-frequency representation may be a Short-time Fourier Transform or STFT calculated by computing a discrete Fourier transform (DFT) of a small, moving window across the duration of the window. An example format may be a graph with two geometric dimensions: one axis represents time, and the other axis represents frequency; a third dimension indicating the amplitude of a particular frequency at a particular time may be represented by the intensity or color of each point in the image. Other formats are possible.

At step 630, the spectrograms may be transformed in order to help the model distinguish. Examples include cropping the image, tonal noise reduction, smoothing, signal enhancements, resizing, standardization, normalization, etc.

At step 640, the image classification algorithm may be trained on the transformed visual data. For instance, a convoluted neural network model may be trained on the data to detect and/or classify sounds.

Figure 6B:
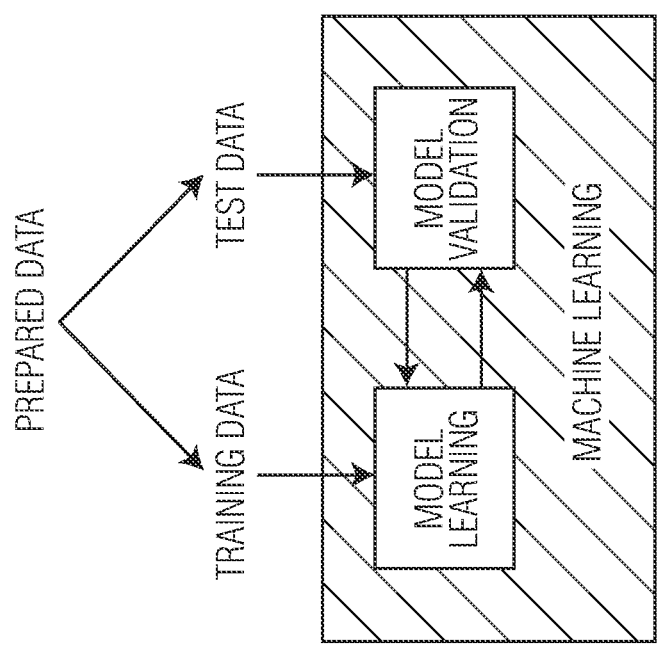

FIG. 6B illustrates an example training process. The model may be trained on the spectrograms to learn the general feature representations that separate background noise and other acoustic events from biological sounds. A hold-out test set may be taken from the training dataset to determine model predictive performance on un-seen data. The model may consume batches of spectrograms until the entire training dataset is fed through the network which then may constitute one epoch.

Many epochs may be set to run until the model converges. The dataset may be shuffled for every epoch to help ensure there is no undesired ordering learned, and to promote model generalization.

Model performance may be monitored both on the training data and the hold-out test set at the end of every epoch via performance metrics (loss and accuracy) which may further expose any overfitting or underfitting. Overfitting may be where the model performance on the training set exceeds performance on the unseen test-set. Underfitting may be where the model performance on the unseen test-set exceed that on the training set. The aim may be to maintain a difference between the metrics of training and testing sets within an acceptable tolerance. Model checkpoints and early stopping may allow for the best model parameterization to be maintained, even if further training proceeds (which could result in a model with worse predictive performance).

As described above, the training data in this case may comprise annotated data. Supervised learning may be a type of machine learning algorithm that requires data and corresponding annotated labels to train. The typical training procedure may comprise: feeding annotated data to the machine to help the model learn, and testing the learned model on unannotated data. To find the accuracy of such a method, annotated data with hidden labels may be typically used in the testing stage of the algorithm. Thus, annotated data may be a necessity for training machine learning models in a supervised manner. Validation data may also be used to help tune the hyperparameters of the model. Thus, the input data set may be split into training data, validation data and test data, e.g. in the proportions 70%, 15%, 15%. Note that many other proportions may also be used.

Test dataset can change throughout training models in a cross-validation approach. It may be used for determining which model architecture performs best on average given different splits of train/test data. Validation data may be held-out entirely, at all times and it may be the final validation point.

The pipeline for using the model for detecting marine mammal vocalizations may follow a similar pipeline to that shown in FIG. 6A, except the detected samples may be real time samples without annotation and the model outputs a detection, e.g. classification of the input sample as a marine mammal vocalization or not.

The model may be configured to just detect the presence or not of a mammal through its vocalization, e.g. a binary decision to inform the vessel operator whether to continue activities or stop. Thus, the training data set, e.g. inputs to the model used for training and testing, may be simply the transformed audio samples and a binary Y/N indicating whether or not a marine mammal is present. However, in other examples, it may be useful to also classify the type of mammal detected, e.g. whales or delphinids, species, etc. by allowing the model to learn to distinguish different groups or species of mammal by training the model on data that includes the mammal group or species.

In more detail, the model may use two different pipelines for identifying marine mammal vocalizations concentrating respectively on mid frequency and low frequency vocalizations.

Mid Frequency Model

In the mid frequency model the process may proceeds as follows:—

1. 2 second audio may be decimated to 48 kHz (multichannel input)

Many AI approaches may reduce the sample rate of their input signals (called downsampling) to reduce the computational load during training time. Downsampling may remove high frequency information from a signal, which may be seen as a necessary tradeoff when developing models.

2. Audio may be converted from stereo to mono (single channel)

Similarly, it may be that the additional information contained in a stereo audio file can be dispensed with without significantly impacting the models ability to learn and predict. It may not be suitable for species classification.

3. Audio may be Fourier transformed to produce the two-dimensional power (dB) spectrogram with the following properties:

Number Fourier transforms: 512

Hop length: 256 (number of audio samples between adjacent Fourier transform columns)

Window length: 512

Window type: cosine window ('hann') (https://docs.scipy.org/doc/scipy/reference/generated/scipy.signal.windows.hann.html) (The contents of this reference is incorporated by reference.)

4. Spectrogram may be resized to satisfy model input requirements without distorting the image The two-dimensional convolutional neural network model input may require images with dimensions 256×256×1 (H, W, C), where the last dimension is the channel.

5. Tonal noise reduction may be applied to the spectrogram. This may help the neural network distinguish the important features from the background noise.

Tonal noises may be evident in many of the audio samples and may be continuous throughout the spectrogram image. Tonal noise may be removed as a pre-processing step to avoid the model learning features corresponding to tonal noise.

6. Spectrogram may be standardised to zero mean and unit variance.

The purpose of standardizing the spectrogram values may be to help treat each one and their respective features fairly. Reducing the value ranges of the images may also help to increase calculation times, thus potentially leading to faster model convergence.

7. Spectrogram may be issued to a deep convolutional neural network (e.g., Inception V3 architecture as the backbone model with global average pooling, dropout layer and final dense prediction layer.) FIG. 9 shows an example of a suitable architecture.

Many model architectures may now exist for image classification with varying rates of success across many applications. One such model (ResNET50) may result in excellent performance metrics on detecting humpback calls. Azure Machine Learning Studio may be used to trial various model architectures, which may lead to a high performing model being the Inception V3 architecture.

In production, the software may issue 2 seconds of audio every 500 ms to the mid-frequency pipeline. Between approx. 500 ms and 700 ms may give a good balance between speed and computational overhead.

The output of the pipeline may be a floating-point value representing the prediction on a scale of 0-1 where a 0 represents "no detection" and 1 represents "detection". The threshold may be defaulted to, e.g., 0.75, but can be altered by the user.

Low Frequency Model

In the low frequency model the process may proceed as follows:—

1. Audio may be decimated to 1.5 kHz (multichannel input)

This may be effectively zooming into the lower frequency domain where ultra-low frequency whale calls may be observed. It may also be the noisiest part of the spectrogram.

2. Audio may be converted from stereo to mono (single channel)

This may be the same process as in the mid-frequency model—e.g., a mean through all samples in the audio.

3. Audio may be Fourier transformed to produce the two-dimensional spectrogram. This Fourier transform algorithm parameters may differ from that of the mid-frequency and may be specific to this low frequency domain.

Number Fourier transforms: 256
Window length: 256
Hop length: 8 (number of audio samples between adjacent Fourier transform columns) Window type: cosine window ('harm')

These parameters (e.g., the number of Fourier transforms, hop length and window length) may be manually adjusted on samples with a marine mammal vocalization present. Adjusting these parameters may affect the temporal and/or frequency resolution. The final set of parameters may be found to best expose the vocalization on the low frequency spectrogram.

4. Spectrogram may be resized

This may be to standardise the sizes of the images without distorting them and/or to benefit from matrix/array operations which are computationally efficient.

5. Tonal noise reduction may be applied to the spectrogram.

This may be the same process as in the mid-frequency model

6. Filters may be applied to the spectrogram to expose acoustic artifacts
   A gaussian filter may be applied to help remove noise, followed by a fragni filter (e.g., specifically for detection of continuous ridges)

7. Artifact blobs may be isolated and labelled
   An isodata threshold may be applied to create a binary/Boolean image, potentially followed by a labelling process algorithm to label each individual artifact in the image and calculate its area.

8. The largest artifact may extracted

Manual review of outputs at this stage may lead to the conclusion that the largest artifact in the image has a much higher chance of being a marine mammal vocalisation. However, large artifacts generated by non-biological sources may also be output. A further stage of classification may therefore be required.

9. Any combination of the following features may be generated from this artifact based, for example:
   % coverage of the artifact bounding box relative to whole image
   % of signal relative to the image
   % of signal within relative to artifact bounding box
   ratio of artifact bounding box x to whole image
   ratio of artifact bounding box y to whole image
   Aspect ratio of artifact bounding box
   Mean width of signal along y relative to artifact bounding box
   Mean width of signal along x relative to artifact bounding box
   Mid width of signal along x relative to artifact bounding box
   Mid width of signal along y relative to artifact bounding box
   Center of mass relative to image (x and y coordinate)
   Center of mass relative to artifact bounding box (x and y coordinate)

Figure 10A:
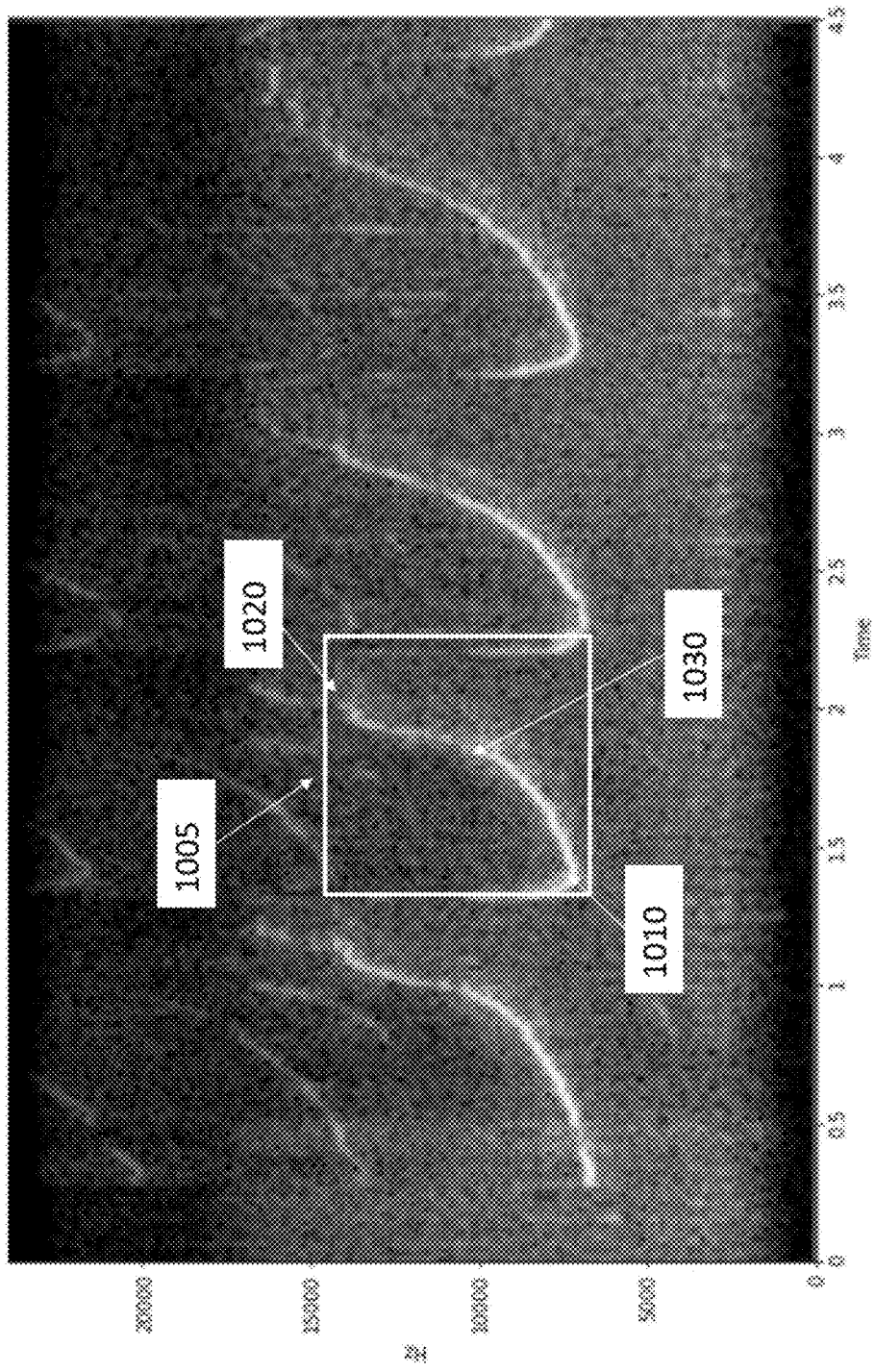
FIGS. 10A and 10B shows another example of detecting marine mammal vocalizations.

FIG. 10A shows an example of a spectrogram with bounding box 1005 surrounding an artifact indicative of a marine mammal vocalization. In this example, features including centroid 1030, min x, min_y, (1010) max_x, max_y (1020) points may be labelled.

Figure 10B:
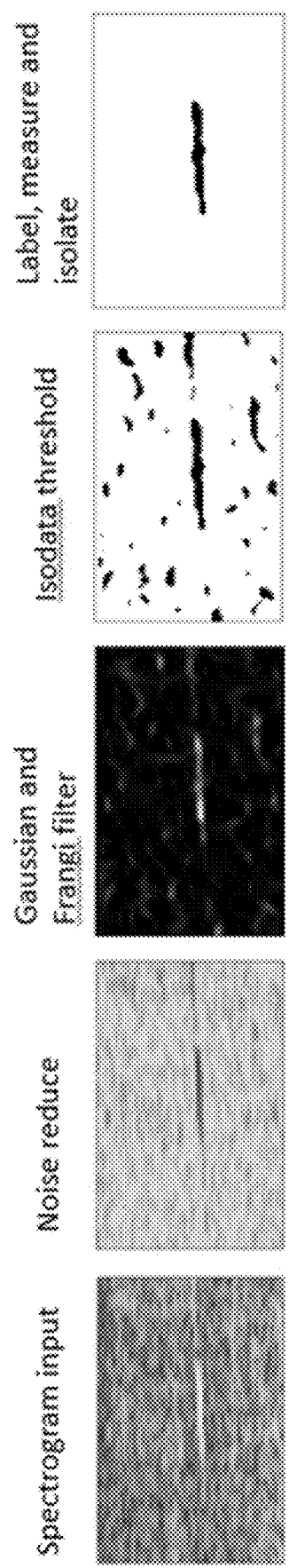

FIG. 10B provides an example of a marine mammal vocalization present in the spectrogram. The process described above may lead to the extraction of the largest acoustic feature.

10. The features may be standardised using a pre-trained scaler.

Once all features are generated for the feature, these values of the features may be standardised to give all features (initially) the same weight and to help ensure features with larger magnitude do not affect model learning.

11. The scaled features may be issued to a tree-based classifier for inference.

Tree-based classification models may be a type of supervised machine learning algorithm that uses a series of conditional statements to partition training data into subsets. Each successive split may add some complexity to the model, which can be used to make predictions. The end result model can be visualized as a roadmap of logical tests that describes the data set.

The entire process from raw sound input to classification may be wrapped into a data processing pipeline which may serve to allow further training and inference with new.

The classification model can be automatically derived from training data by iteratively splitting the data into separate cohorts based on its features and then measuring the purity of the leaf. If it's pure, there may be no need to keep splitting it, if it is not, then continue splitting may be done until convergence is reached and there are no more features to split to achieve a better performance metric.

In production, the software may issue 1 second of audio every 500 ms to the low frequency pipeline. Between approx. 500 ms and 700 ms may give a good balance between speed and computational overhead.

The output of the pipeline may be a floating-point value representing the prediction on a scale of 0-1 where a 0 represents "no detection" and 1 represents "detection". The threshold may be defaulted to e.g. 0.75.

A decision tree based approach may work well with low frequency sounds and whale vocalizations and sounds in particular, and may exhibit signs of good generalization across large test sets which have been validated by marine mammal acoustic operators as the input data may contain quite a lot of noise in the low frequencies and this technique may be resistant to noise. Low frequency images may be such low resolution features that the model could not develop weights to properly converge if a neural network technique, such as used for the mid frequency model, were used. Also, ultra low frequency whale sounds may not be so complex in shape, whereas the mid frequency sounds can be very complex, undulating sounds, which is why the low frequency approach may not work in the mid range.

The above techniques in combination may have a high (e.g., at least an 80%) success rate in detecting marine mammal vocalizations and this may increase to 90% or more over time with sufficient high quality input data to train the models.

FIGS. 11 to 18 show examples of screens and pop-up windows as part of a user interface which may allow an operator to interact with the software system and particularly to play audio, display spectrograms, display the output of the model and validate the model predictions, as well as other functions.

Figure 11:
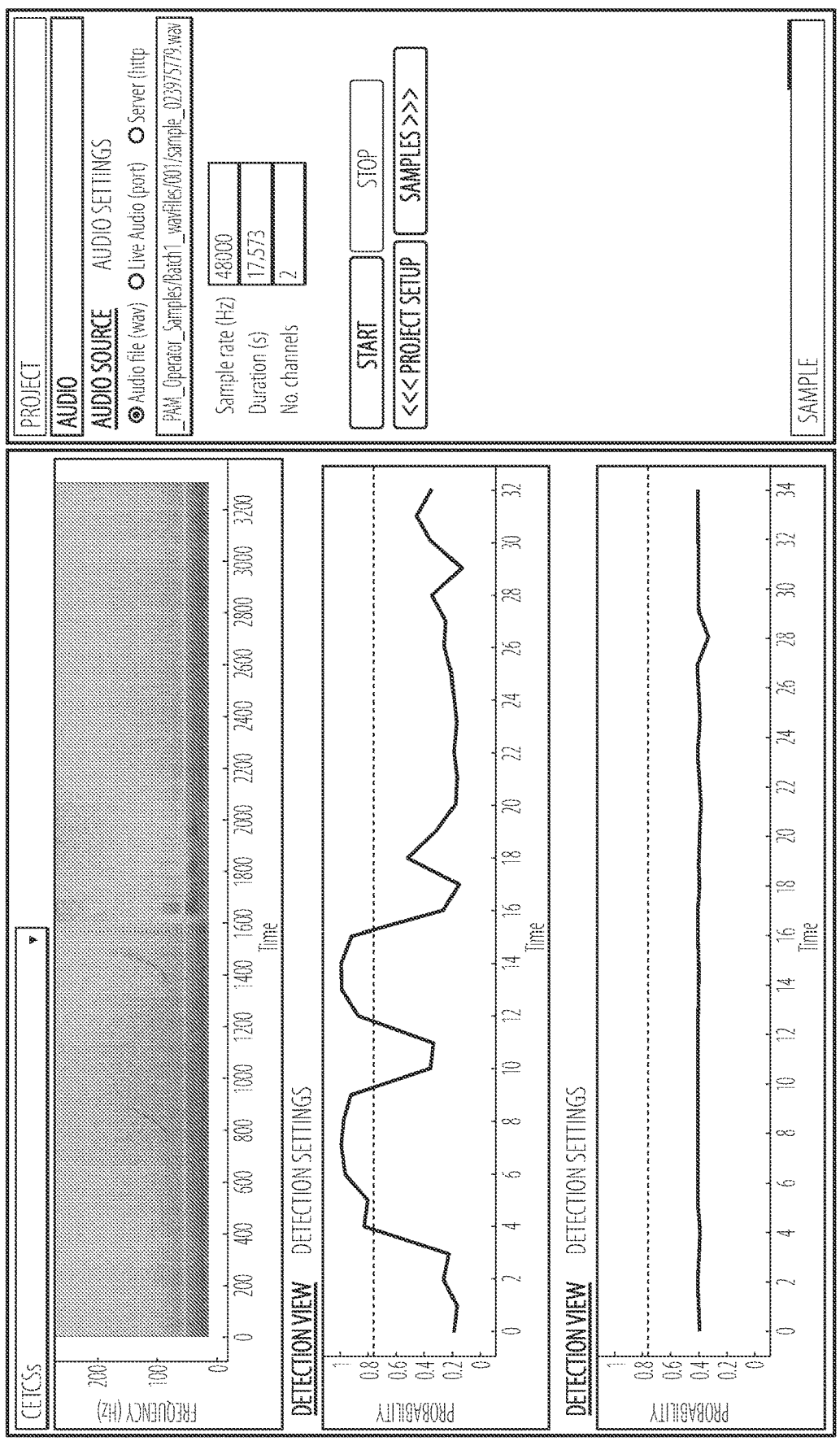

FIG. 11 shows a real-time spectrogram (A), the mid frequency detector (B), the low frequency detector (C), and the user panel (D) (project creation, audio source select, database and sample validation). It can be seen in this example, that the output probability for the low frequency detector (shown by the line in plot B) peaks above 0.75 (or whatever threshold has been set) at points coinciding with the vocalizations shown in the spectrogram (A), which may indicate that the low frequency model has made a positive detection. The mid frequency model output may maintain a low probability output throughout.

Figure 12:
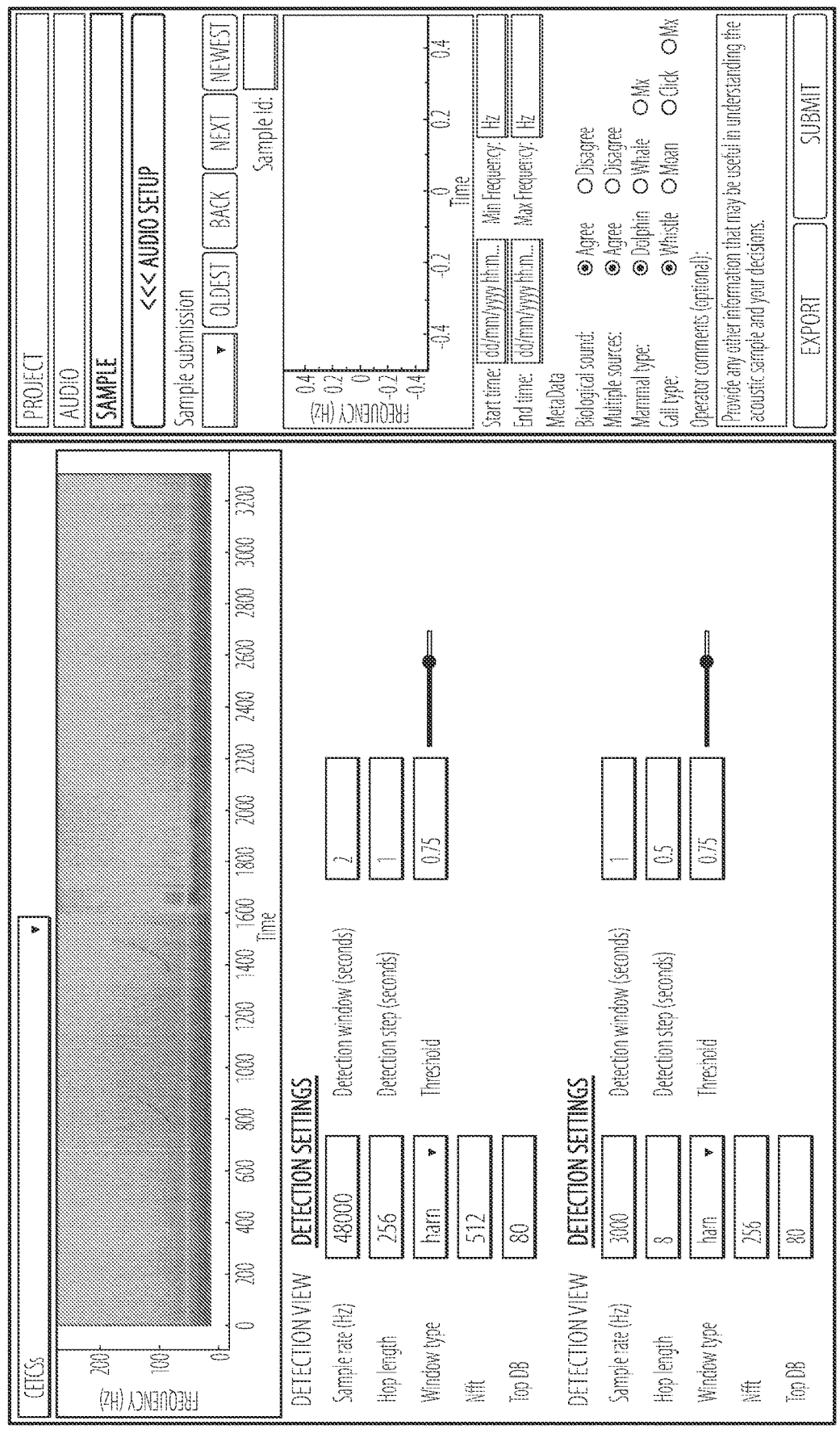

FIG. 12 shows settings allowing the operator to vary the parameters of the model, e.g. the mid frequency detector parameters (E) and low frequency detector parameters (F). The sidebar (G) shows the ability of the operator to validate the sample and submit it to the database for future use in training the model or other research. The operator can add metadata such as whether the sample is identified das a whale or dolphin and the call type. This can be used in analysis in determining the accuracy of the model for different types of call.

FIG. 13 shows a dialog for the operator to create a project, e.g. to collect data relating to a particular instance of monitoring activity on a particular boat on a particular date by a particular operator, etc.

Figure 15:
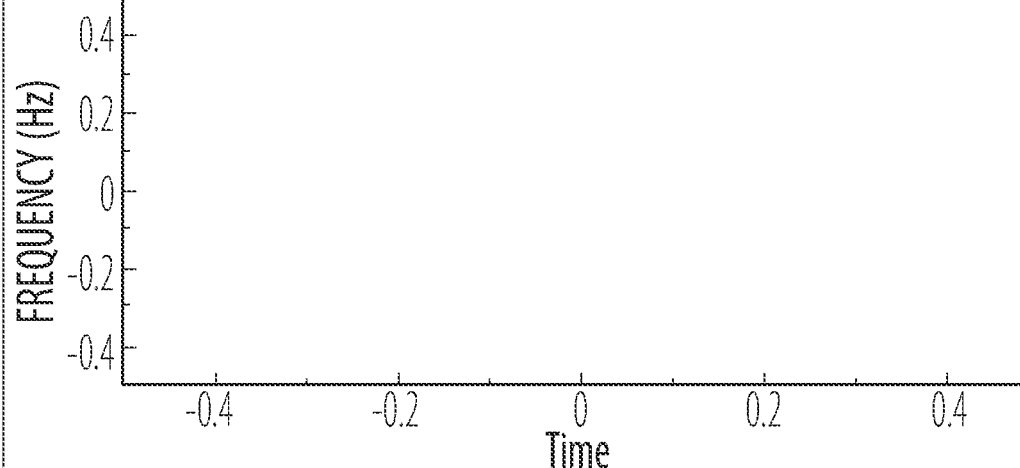

FIGS. 14 to 16 shows the ability of the operator to then open and load a particular audio source for analysis. This can be from a file, received live, or streamed from a server. As shown by FIG. 17, the operator can configure the audio stream received from the server.

Figure 18:
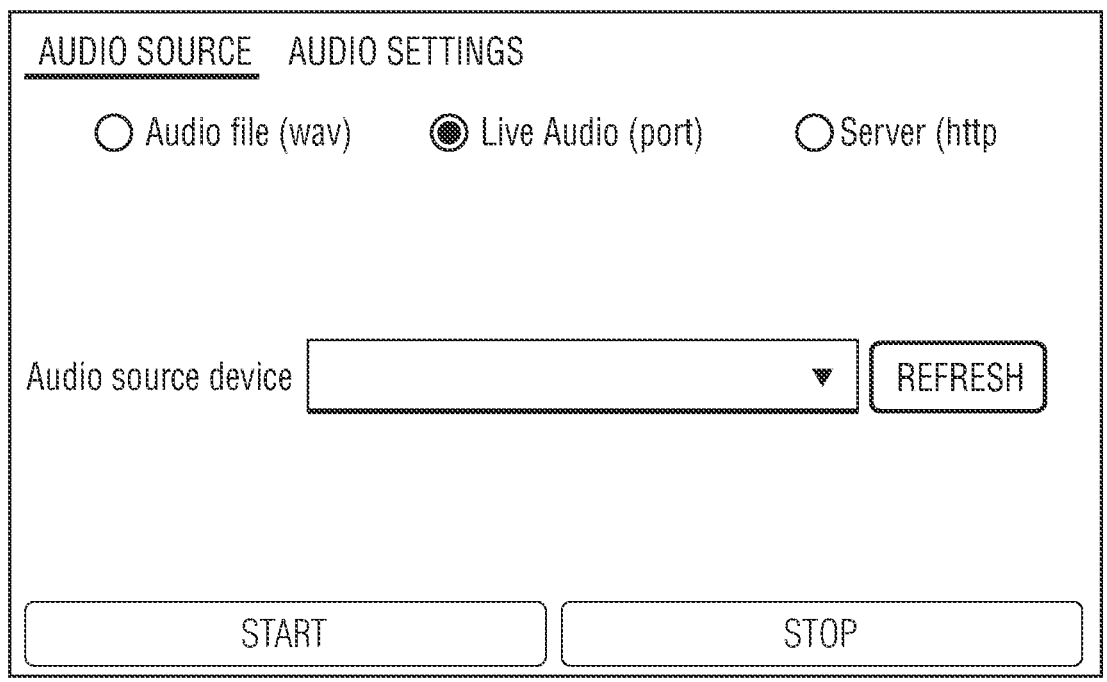

FIG. 18 shows more detail of the dialog for the user to submit a sample to the master database. The user may review the sample, add metadata, and submit to the database (e.g. supported by backend SQLite database file).

Figure 19:
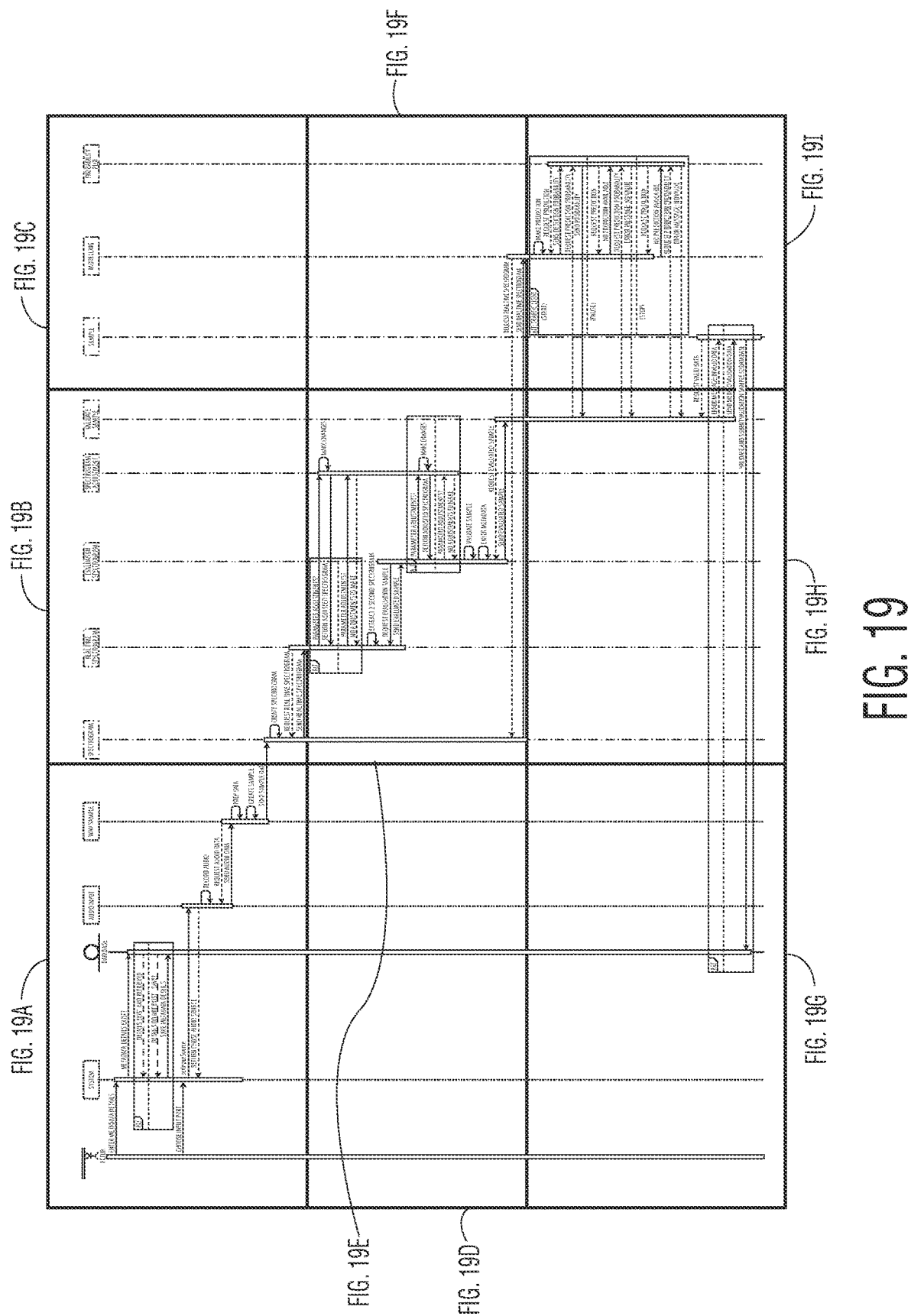
FIG. 19-19I show an example of an overall process.
Figure 19A:
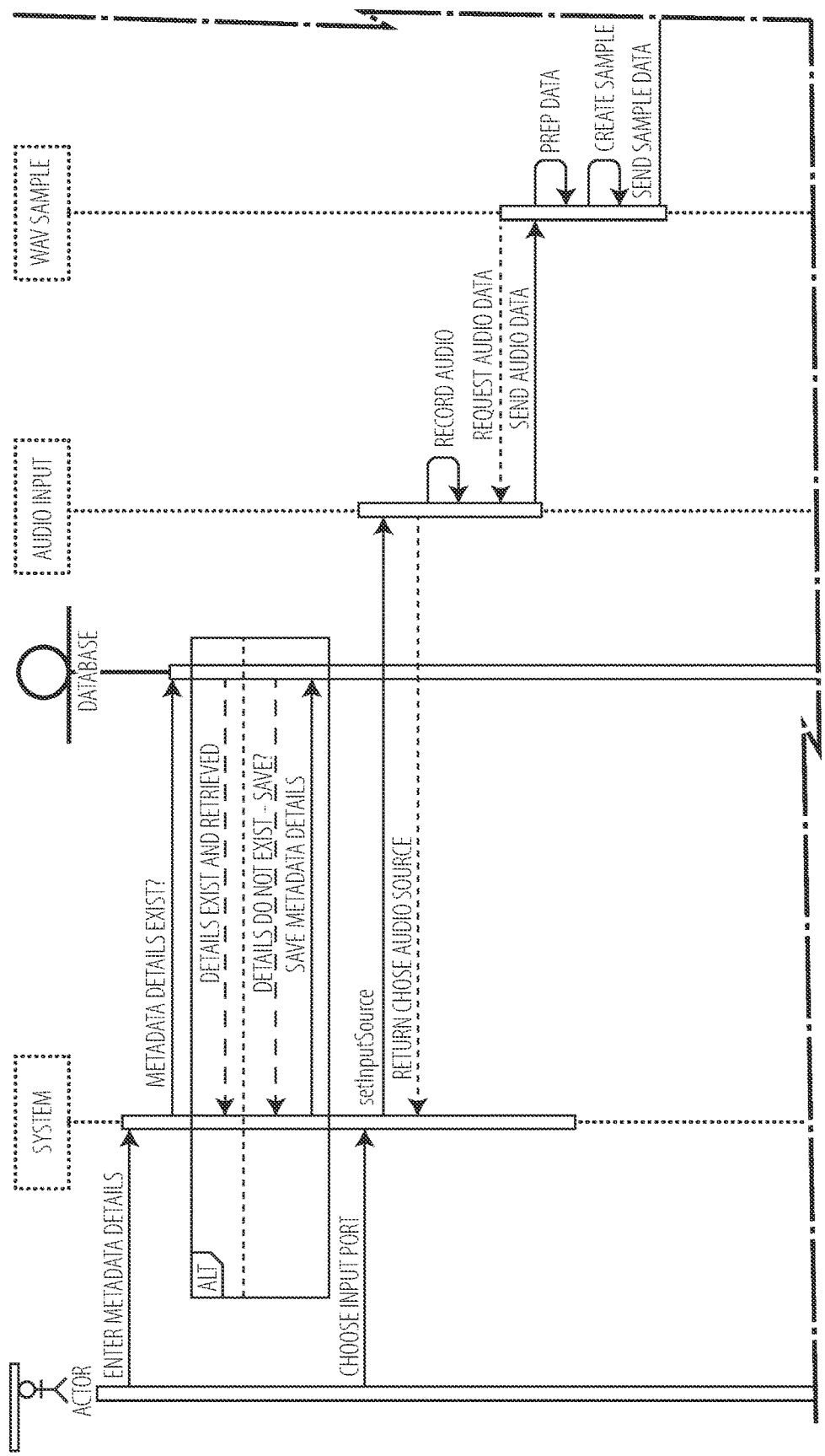
Figure 19C:
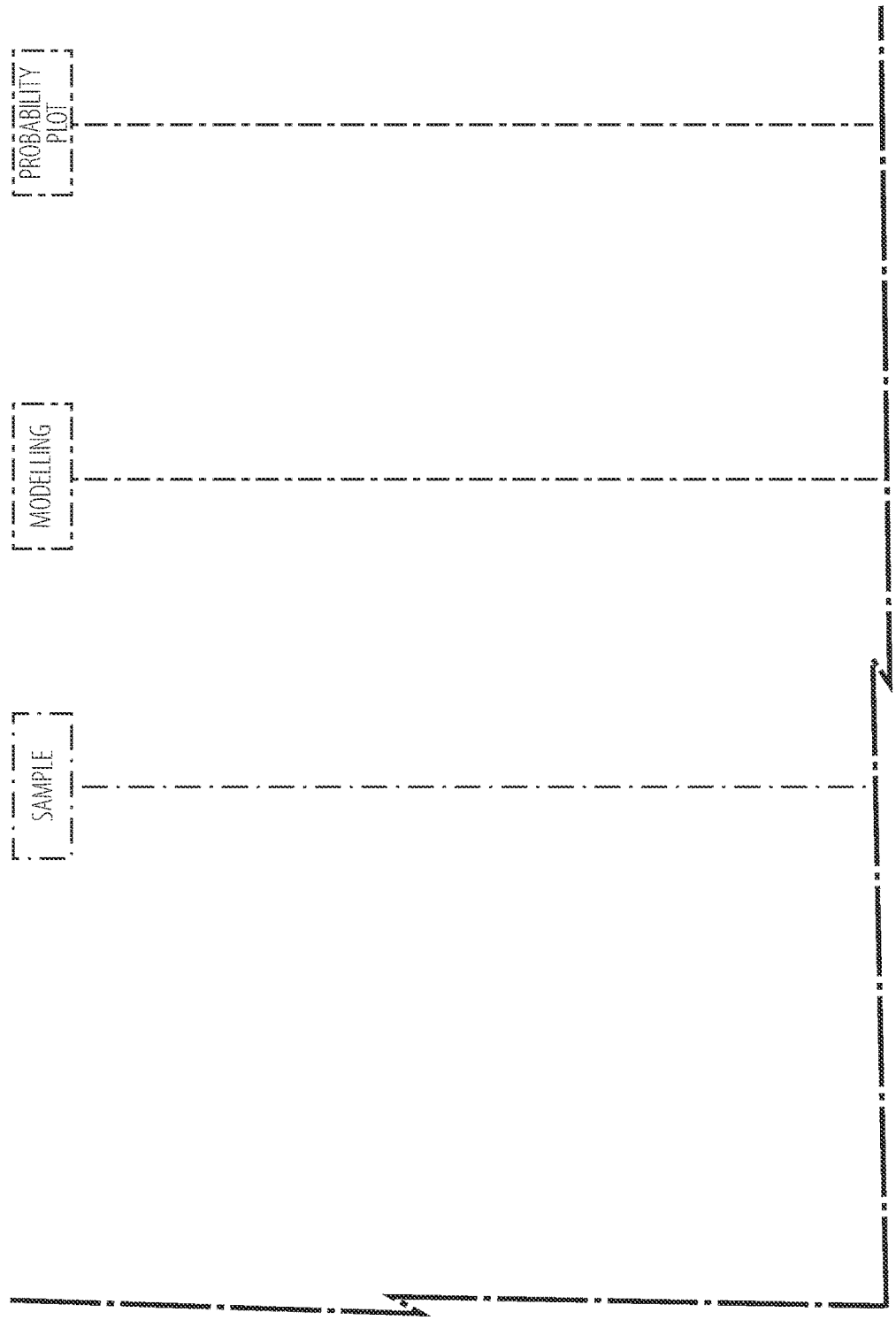
Figure 19D:
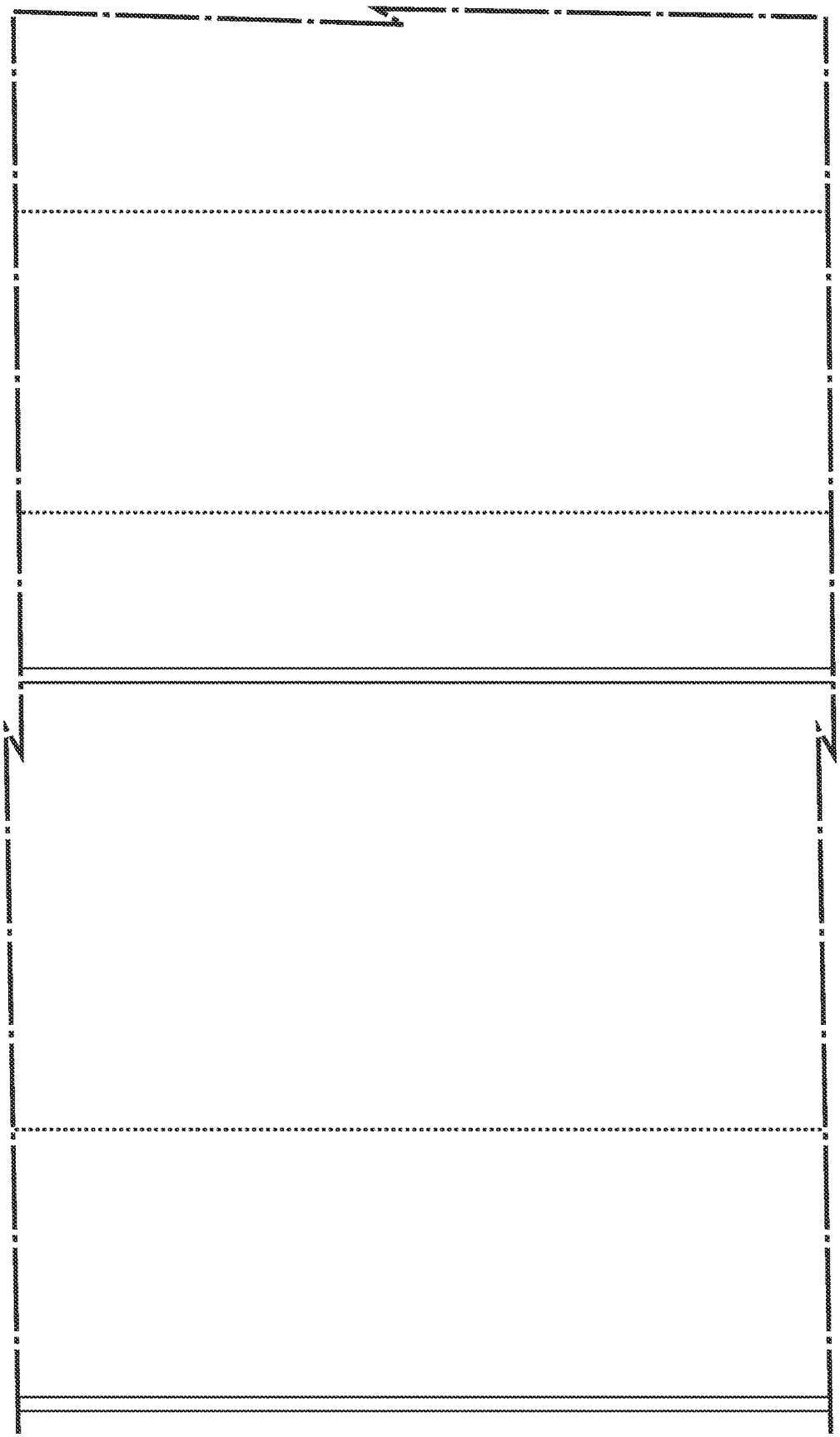
Figure 19E:
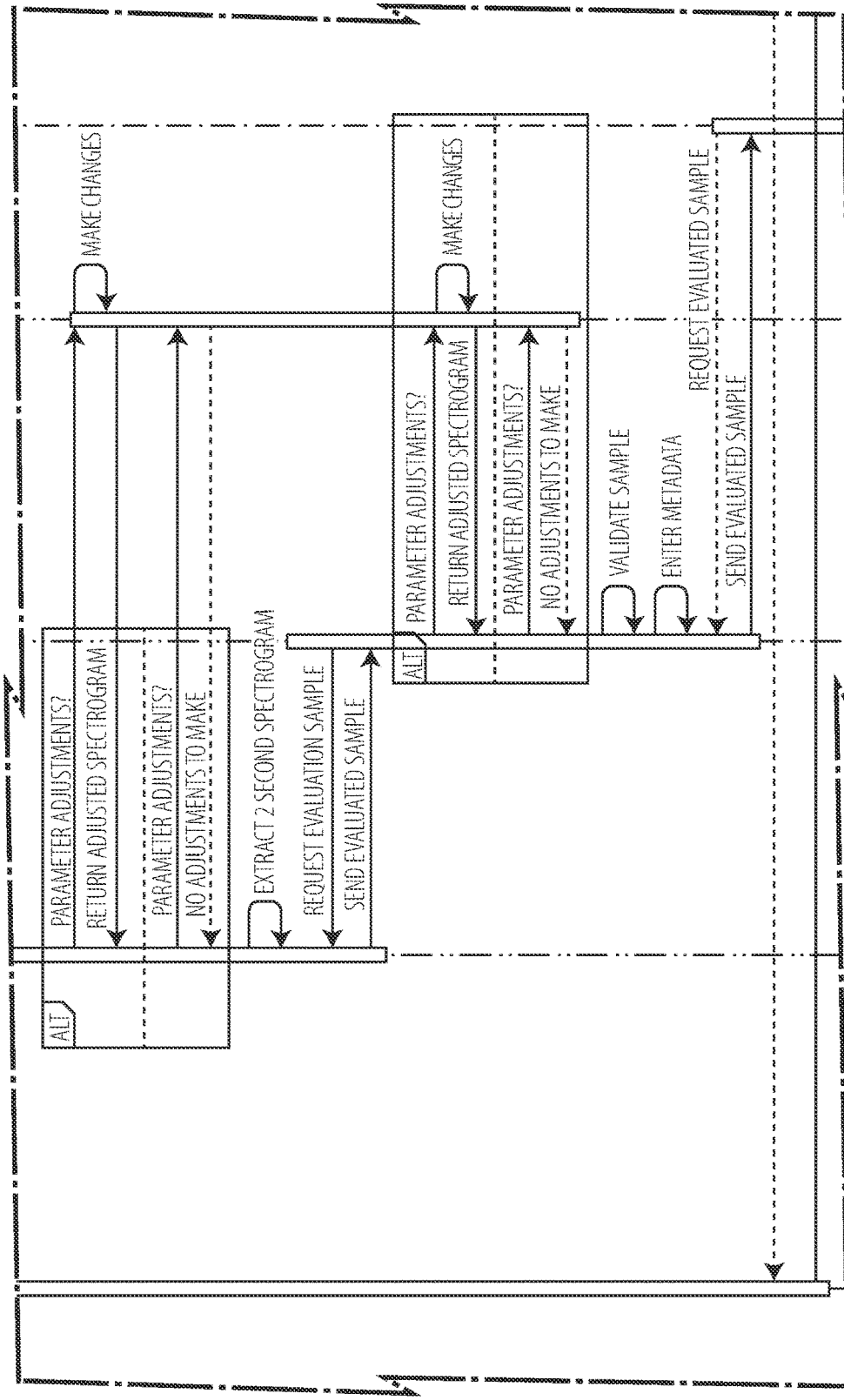
Figure 19F:
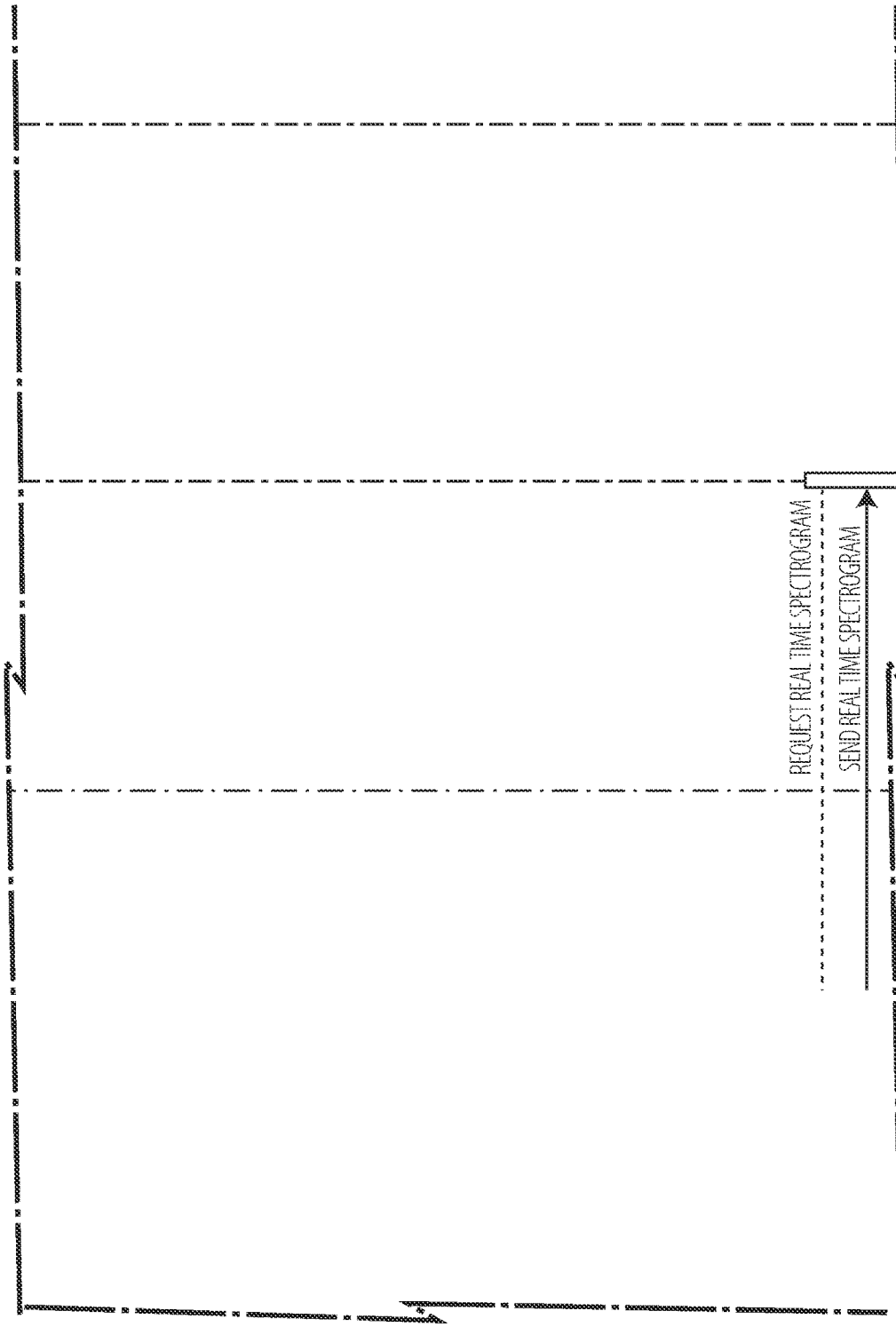
Figure 19H:
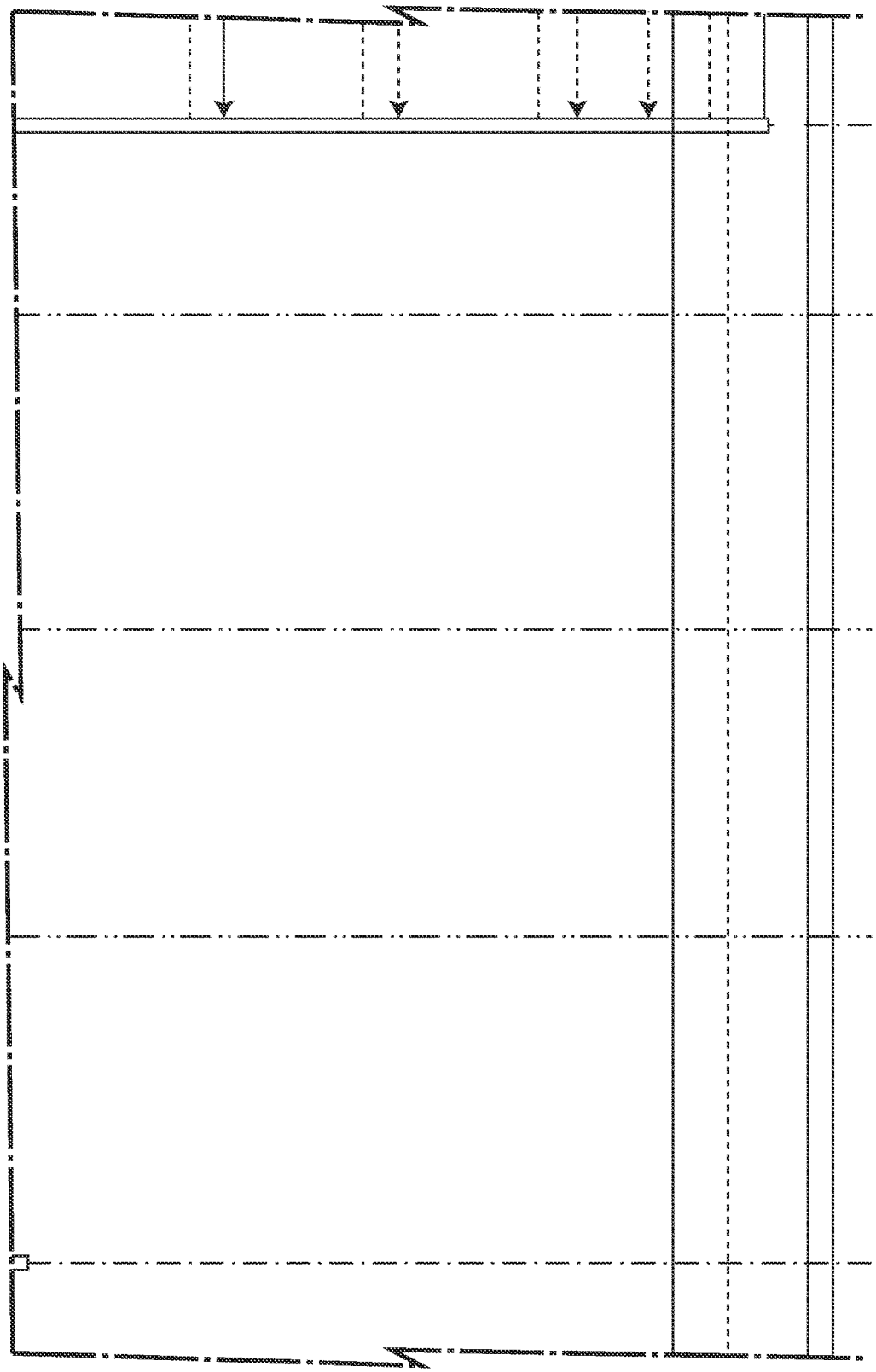
Figure 19I:
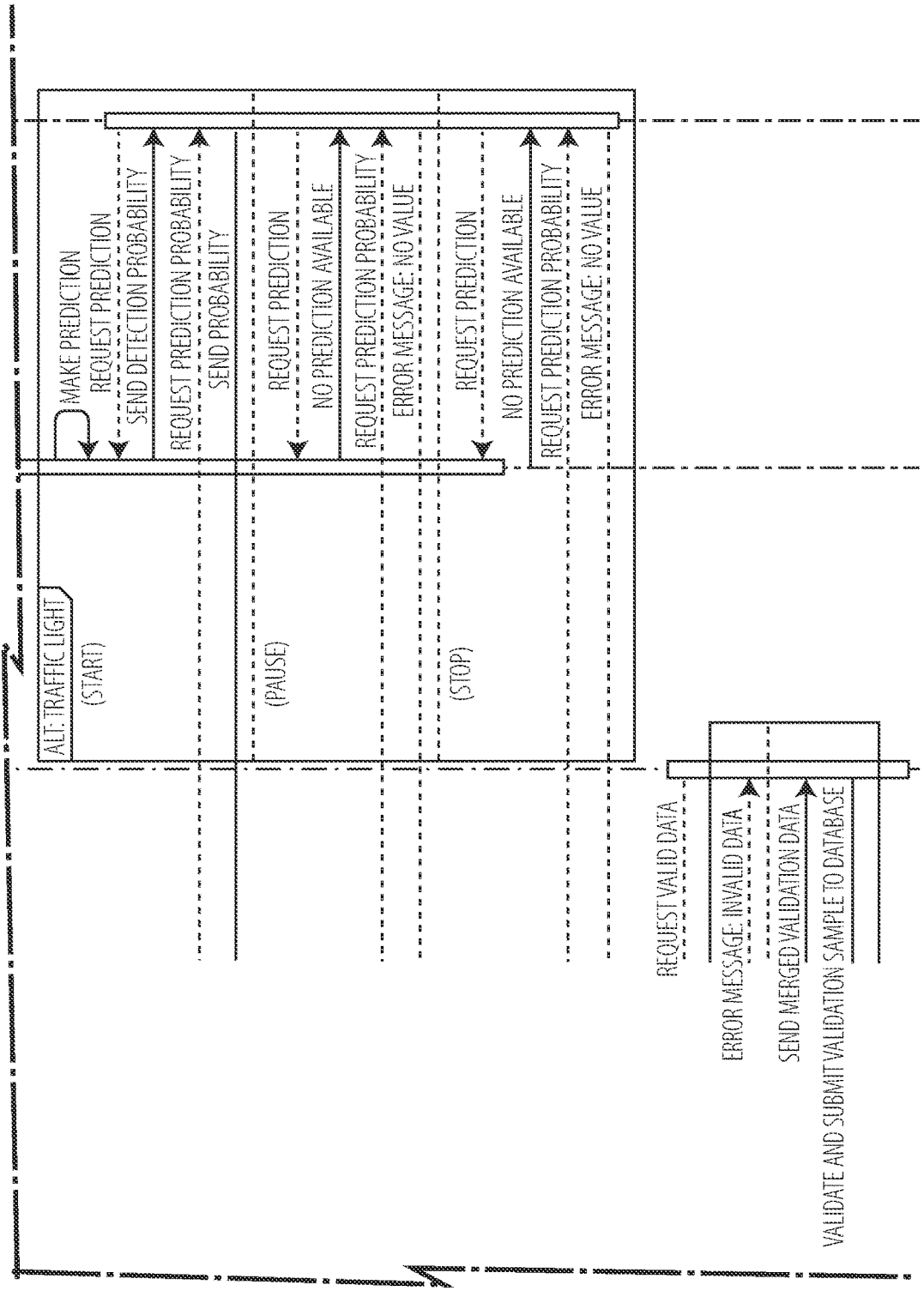

FIG. 19 shows an example of the overall process.

CONCLUSION

Aspects of the disclosure provide a computer implemented method of detecting marine mammals, the method comprising: receiving acoustic data from one or more hydrophones; sampling the acoustic data and transforming the sampled acoustic data to time-frequency image data; processing the image data to transform the data to be suitable for input to a model; input the transformed input data to at least one model trained to detect the presence or absence of marine mammal vocalizations in the acoustic data, wherein the model automatically outputs a prediction of whether or not a mammal is present; providing output to a user indicating the prediction. This may allow for automation of the process of detecting marine mammals based on an audio feed and so provide objective, accurate predictions that require much reduced or no operator input.

In other aspects of the disclosure, inputting the prepared input data to each of two different models, respectively arranged to detect marine mammal sounds or vocalizations in different frequency ranges corresponding respectively to different mammal sounds or vocalizations. It has been found that different models are particularly well adapted for detecting mammal vocalizations in different frequency ranges, where different vocalizations and different types of noise may be expected. Thus, an important part of this aspect can be using different models to detect in particular whale noises in the low frequencies, and dolphin noises in the mid frequencies. Example frequencies are 0 Hz-3000 Hz for the low frequency model and 0 Hz to 48,000 Hz for the mid frequency model (which in the spectrogram is 0-1500 Hz and 0-24,000 Hz respectively). Different preprocessing of the data may be used for each model, such as generating spectrograms from the audio data with different parameters, etc.

In an example, at least a first model is a neural network iteratively trained to classify the mid frequency acoustic data on training set data comprising acoustic samples and label data indicating whether or not the sound or vocalization of a marine mammal is present in the sample. This model is found to be particularly effective for detecting whistles and moans of dolphins. Mid frequency sounds can be very complex, undulating sounds, leading to advantages for a neural network based approach, and which is why the low frequency approach would not work in the mid range.

In another example, a second model is a rule based approach operating on features extracted from the image data applied to low frequency acoustic data. This model has been found to be particularly effective in detecting vocalizations, e.g. moans, of whales and in particular picking out low resolution features from the noising low frequency audio ranges. Low frequency images are such low resolution features that the mid frequency neural network model could not develop weights to properly converge Embodiments of the present disclosure have been described with particular reference to the examples illustrated. However, it will be appreciated that variations and modifications may be made to the examples described within the scope of the present claims.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown. In particular, the elements of any flowchart or process figures may be performed in any order and any element of any figures may be optional.

Although the term "at least one" may often be used in the specification, claims and drawings, the terms "a", "an", "the", "said", etc. also signify "at least one" or "the at least one" in the specification, claims and drawings. The terms "including" and "comprising" and any similar terms should be interpreted as "including, but not limited to" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:
1. A computer implemented method of detecting marine mammals, the method comprising:
receiving input data including acoustic data from one or more hydrophones on-board vessels;
down sampling the acoustic data and transforming down sampled acoustic data to time-frequency image data, the time-frequency image data being a visual representation of a spectrum of frequencies of the acoustic data varying with time, wherein first image data is produced for mid frequency ranges and second image data is produced for low frequency ranges by down sampling the acoustic data for the first image data at a mid-frequency rate and down sampling the acoustic data for the second image data at a low-frequency rate, and using different Fourier transform properties in transforming sample acoustic data to image data for a first image and a second image comprising at least a number of samples of acoustic data used in each Fourier transformation;

processing the image data to transform the data for input to a model by applying a tonal noise reduction filter to the first image data and second image data;

inputting transformed first image data to a first model trained to detect a presence or an absence of marine mammal vocalizations in the acoustic data, wherein the first model is a convolutional neural network which automatically outputs a prediction of whether or not a mammal is present;

inputting transformed second image data to a second model trained to detect the presence or the absence of marine mammal vocalizations in the acoustic data, wherein the second model comprises: identifying an acoustic artifact in the transformed second image data, extracting features for the acoustic artifact, and inputting the features to a rules-based classifier which automatically outputs the prediction of whether or not a mammal is present; and providing output to a user indicating predictions.

2. The method of claim 1, wherein the transformed first image data is provided to the first model in successive first windows of a first time duration and the transformed second image data is provided to the second model in successive second windows of a second time duration, wherein the first time duration is different from the second time duration.

3. The method of claim 1, wherein the convolutional neural network uses one or more machine learning algorithms to learn and converge on a solution.

4. The method of claim 3, wherein processing the image data comprises one or more of:

resizing the image data to suit model input requirements; and standardizing the image data to zero mean and unit variance.

5. The method of claim 3, comprising splitting the input data into at least training data and test data, comprising training the model on training data and testing the data on the test data to determine acceptable performance of the model.

6. The method of claim 5, wherein the convolutional neural network comprises plural layers including a pooling layer before a convolution layer.

7. The method of claim 5, comprising further splitting the input data into validation data, wherein the validation data is used to tune hyperparameters of the model.

8. The method of claim 1, wherein the first model is arranged to detect at least dolphin sounds and the second model is arranged to detect at least whale sounds.

9. The method of claim 1, wherein processing the image data comprises one or more of:

resizing the image data to suit model input requirements; and filtering a spectrogram to expose acoustic artifacts.

10. The method of claim 9, wherein a rules-based classifier is a tree-based classifier.

11. The method of claim 10, comprising drawing a bounding box around the acoustic artifact, and wherein a plurality of features comprise one or more of:

a. spatial position, comprising one or more of centroid, minimum x, minimum y, maximum x, maximum y positions, wherein x is a position in a time axis and y is the position in a frequency axis; and b. percentage coverage relative to its bounding box and a whole image.

12. The method of claim 10, comprising standardizing features using a pre-trained scaler.

13. The method of claim 1, where the image data is a power spectrogram obtained using a Short-Time Fourier Transform.

14. The method of claim 1, wherein an output classification distinguishes between biological sources and non-biological sources.

15. The method of claim 1, wherein an output classification distinguishes between groups of aquatic mammals, including whales and delphinids and/or between species.

16. The method of claim 1, comprising using a sliding window of plural time slices of audio data as input to the first model and the second model.

17. The method of claim 1, wherein source data comprises audio files containing the acoustic data and metadata files, and the method comprises identifying samples within the audio files, associating each sample with a metadata file, and recursively extracting standardized metadata from a file to associate with an audio sample in order to standardize labeling of the source data.

18. The method of claim 17, comprising recursively parsing each metadata file and matching metadata with candidate data using machine learning according to predefined rules, developing a score of how successful current rules are in matching data, and recursively altering the rules and repeating a matching process until a predetermined threshold level of success has been met.

19. The method of claim 1, comprising, automatically or in response to accepting user input, ceasing an on board marine activity if the prediction indicates the presence of a marine mammal.

20. The method of claim 19, comprising, automatically or in response to accepting user input, ceasing the on-board marine activity if a prediction indicates a presence of a marine mammal, wherein the acoustic data and/or the image data and prediction are displayed to a user for validation, the method further comprising receiving user input indicating validation of the prediction, wherein user validation overrides a decision to cease marine seismic activity.

21. The method of claim 20, wherein a model is implemented by a computing device on board a vessel from which hydrophone measurements are taken and output to a user for validation comprises communicating data to a remote user over a communication network, the method further comprising receiving the validation back at the computing device for display to a user.

22. The method of claim 21, comprising, adding validated data to training data for refining the model.

23. The method of claim 1, wherein the acoustic data and/or the image data and prediction are displayed to a user for validation.

24. The method of claim 1, comprising training the first model and the second model by, for each model:

receiving input data from hydrophone sensors comprising detected sounds in a marine environment;

extracting audio samples of the input data and labelling with whether or not a marine mammal sound is present in a sample;

transforming the audio samples to image data to form a training data set of labelled image data; and recursively training the model wherein the model is arranged to provide an output prediction of whether or not a marine mammal sound is present in input image data on training data to minimize an error function between predicted output and labeled data.

25. The method of claim 1, comprising using a sliding window of plural time slices of audio data as input to the first model and the second model.

26. The method of claim 1, wherein the first model and the second model are respectively arranged to detect in different frequency ranges corresponding respectively to different mammal sounds or vocalizations.

27. The method of claim 1, wherein the convolutional neural network of the first model is iteratively trained on training set data comprising acoustic samples and label data indicating whether or not a sound or vocalization of a marine mammal is present in a sample in order to classify acoustic data in a mid-frequency range.

28. The method of claim 1, wherein down sampled mid-frequency image data is 0 to 24 kHz and/or down sampled low-frequency image data is 0 to 1.5 kHz.

29. A system for detection of marine mammals, the system comprising:
a processing device and memory holding processor executable instructions;
an input interface configured to receive input data comprising acoustic data from one or more hydrophones on-board a vessel;
a transformation module to down sample the acoustic data and transform down sampled acoustic data to time-frequency image data, the time-frequency image data being a visual representation of a spectrum of frequencies of the acoustic data varying with time, wherein first image data is produced for mid frequency ranges and second image data is produced for low frequency ranges by down sampling the acoustic data for the first image data at a mid-frequency rate and down sampling the acoustic data for the second image data at a low-frequency rate, and using different Fourier transform properties in transforming sample acoustic data to image data for a first image and a second image comprising at least a number of samples of acoustic data used in each Fourier transformation;
a preprocessing module to transform the image data for input to a model by applying a tonal noise reduction filter to the first image data and the second image data;
a first model module trained to detect a presence or an absence of marine mammal vocalizations in transformed first image data, wherein the first model is a convolutional neural network;
a second model trained to detect the presence or the absence of marine mammal vocalizations in transformed second image data, wherein the second model is configured to: identify an acoustic artifact in the transformed second image data, extract features for the artifact, and input the features to a rules-based classifier which automatically outputs a prediction of whether or not a mammal is present; and
an output interface to cause a prediction of whether or not a marine mammal is present to be displayed to a user by a display device or communicated to a remote user.

30. The system of claim 29,
wherein the first model and the second model are respectively arranged to detect in different frequency ranges corresponding respectively to different mammal sounds or vocalizations.

31. The system of claim 29, wherein convolutional neural network of the first model is iteratively trained on training set data comprising acoustic samples and label data indicating whether or not a sound or vocalization of a marine mammal is present in a sample in order to classify acoustic data in a mid-frequency range.

32. The system of claim 29, wherein output classification distinguishes between biological sources and non-biological sources.

33. The system of claim 29, wherein the transformed first image data is provided to the first model in successive first windows of a first time duration and the transformed second image data is provided to the second model in successive second windows of a second time duration, wherein the first time duration is different from the second time duration.

34. The system of claim 29, wherein the convolutional neural network uses one or more machine learning algorithms to learn and converge on a solution.

35. The system of claim 34, wherein processing the image data comprises one or more of:
resizing the image data to suit model input requirements; and
standardizing the image data to zero mean and unit variance.

36. The system of claim 34, wherein the processor executable instructions comprise: splitting the input data into at least training data and test data, comprising training the model on training data and testing the data on the test data to determine acceptable performance of the model.

37. The system of claim 36, wherein the convolutional neural network comprises plural layers including a pooling layer before a convolution layer.

38. The system of claim 36, wherein the processor executable instructions comprise: further splitting the input data into validation data, wherein the validation data is used to tune hyperparameters of the model.

39. The system of claim 29, wherein the first model is arranged to detect at least dolphin sounds and the second model is arranged to detect at least whale sounds.

40. The system of claim 39, wherein processing the image data comprises one or more of:
resizing the image data to suit model input requirements; and
filtering a spectrogram to expose acoustic artifacts.

41. The system of claim 40, wherein the rules-based classifier is a tree-based classifier.

42. The system of claim 41, wherein the processor executable instructions comprise drawing a bounding box around the acoustic artifact; and
wherein a plurality of features comprise one or more of:
a. spatial position, including one or more of centroid, minimum x, minimum y, maximum x, maximum y positions, wherein x is a position is in a time axis and y is the position in a frequency axis; and
b. percentage coverage in relative to its bounding box and a whole image.

43. The system of claim 42, wherein the processor executable instructions comprise standardizing the features using a pre-trained scaler.

44. The system of claim 29, wherein the image data is a power spectrogram obtained using a Short-Time Fourier Transform.

45. The system of claim 29, wherein output classification distinguishes between groups of aquatic mammals, including whales and delphinids and/or between species.

46. The system of claim 29, wherein source data comprises audio files containing the acoustic data and metadata files; and the system comprises processor executable instructions for identifying samples within the audio files, associating each sample with a metadata file, and recursively extracting standardized metadata from a file to associate with an audio sample in order to standardize labeling of the source data.

47. The system of claim 46, wherein the processor executable instructions are configured for: comprising recursively parsing each metadata file and matching metadata with candidate data using machine learning according to predefined rules, developing a score of how successful current rules are in matching data, and recursively altering rules and repeating a matching process until a predetermined threshold level of success has been met.

48. The system of claim 29, wherein the processor executable instructions are configured for: automatically or in response to accepting user input, ceasing an on board marine activity if the prediction indicates the presence of a marine mammal.

49. The system of claim 48, wherein the processor executable instructions are configured for automatically or in response to accepting user input, ceasing the on-board marine activity if the prediction indicates the presence of a marine mammal; wherein the acoustic data and/or the image data and prediction are displayed to a user for validation; and wherein the system further comprises processor executable instructions for receiving user input indicating validation of the prediction, wherein user validation overrides a decision to cease marine seismic activity.

50. The system of claim 49, wherein the model is implemented by a computing device on board a vessel from which hydrophone measurements are taken and output to a user for validation comprises communicating the data to a remote user over a communication network and receiving the validation back at the computing device for display to a user.

51. The system of claim 50, wherein the processor executable instructions comprise adding validated data to training data for refining the model.

52. The system of claim 29, wherein the acoustic data and/or image data and prediction are displayed to a user for validation.

53. The system of claim 29, comprising training the first model and the second model by, for each model:
receiving input data from hydrophone sensors comprising detected sounds in a marine environment;
extracting audio samples of the input data and labelling with whether or not a marine mammal sound is present in a sample;
transforming the audio samples to image data to form a training data set of labelled image data; and
recursively training a model wherein the model is arranged to provide an output prediction of whether or not a marine mammal sound is present in input image data on training data to minimize an error function between predicted output and labeled data.

54. The system of claim 29, wherein down sampled mid-frequency image data is 0 to 24 kHz and/or down sampled low-frequency image data is 0 to 1.5 kHz.

* * * * *